(12) United States Patent
Watanabe et al.

(10) Patent No.: US 10,331,140 B2
(45) Date of Patent: Jun. 25, 2019

(54) MOVING BODY

(71) Applicant: EQUOS RESEARCH CO., LTD., Tokyo (JP)

(72) Inventors: Yutaka Watanabe, Kota-cho (JP); Daisuke Oaki, Anjo (JP); Akira Otabe, Anjo (JP)

(73) Assignee: EQUOS RESEARCH CO., LTD., Tokyo (JP)

( * ) Notice: Subject to any disclaimer, the term of this patent is extended or adjusted under 35 U.S.C. 154(b) by 66 days.

(21) Appl. No.: 15/539,936

(22) PCT Filed: Dec. 16, 2015

(86) PCT No.: PCT/JP2015/085151
§ 371 (c)(1),
(2) Date: Jun. 26, 2017

(87) PCT Pub. No.: WO2016/104265
PCT Pub. Date: Jun. 30, 2016

(65) Prior Publication Data
US 2017/0357264 A1      Dec. 14, 2017

(30) Foreign Application Priority Data
Dec. 25, 2014    (JP) .................................. 2014-262883

(51) Int. Cl.
*G05D 1/02*        (2006.01)
*G01C 21/36*       (2006.01)
(Continued)

(52) U.S. Cl.
CPC ......... *G05D 1/0212* (2013.01); *G01C 21/005* (2013.01); *G01C 21/20* (2013.01);
(Continued)

(58) Field of Classification Search
CPC ............. G05D 1/0212; G06K 9/00805; G06K 9/00671; G06K 9/00369; G06K 9/00335;
(Continued)

(56) References Cited

U.S. PATENT DOCUMENTS

2003/0138133 A1 *   7/2003   Nagaoka ............ G06K 9/00362
                                                        382/104
2004/0183906 A1 *   9/2004   Nagaoka ................... B60R 1/00
                                                        348/148

(Continued)

FOREIGN PATENT DOCUMENTS

JP        2008-152504 A     7/2008
JP        2008-152600 A     7/2008
(Continued)

OTHER PUBLICATIONS

Machine translation JP 2008-152600A (Year: 2008).*
(Continued)

*Primary Examiner* — Frederick M Brushaber
(74) *Attorney, Agent, or Firm* — Oliff PLC

(57) ABSTRACT

According to the present invention, on the basis of the detected surrounding situation the movement of object bodies in the surrounding area is predicted as a future situation in the surrounding area. Candidates of direction from which a moving direction to be shown to the user is determined are extracted on the basis of the predicted future situation in the surrounding area. The extracted candidates are evaluated for movement easiness of the user in the surrounding area on the basis of the predicted future situation in the surrounding area and the detected situation of the user. Then, the moving direction to be shown to the user is determined on the basis of the evaluation and the extracted candidates. A direction corresponding to the determined moving direction is shown to the user in front of the user.

17 Claims, 16 Drawing Sheets

(51) Int. Cl.
*G01C 21/20* (2006.01)
*G01C 21/00* (2006.01)
*G06K 9/00* (2006.01)
*G01P 13/02* (2006.01)
*G06K 9/52* (2006.01)

(52) U.S. Cl.
CPC .......... *G01C 21/3626* (2013.01); *G01P 13/02* (2013.01); *G06K 9/00335* (2013.01); *G06K 9/00369* (2013.01); *G06K 9/00671* (2013.01); *G06K 9/00805* (2013.01); *G06K 9/52* (2013.01); *G06K 9/00288* (2013.01)

(58) Field of Classification Search
CPC ...... G06K 9/52; G06K 9/00288; G01P 13/02; G01C 21/3626; G01C 21/005; G01C 21/20
See application file for complete search history.

(56) References Cited

U.S. PATENT DOCUMENTS

| | | | | |
|---|---|---|---|---|
| 2005/0049788 | A1* | 3/2005 | Haider | G06K 9/209 |
| | | | | 701/301 |
| 2005/0276450 | A1* | 12/2005 | Taniguchi | B60T 7/22 |
| | | | | 382/104 |
| 2007/0127778 | A1* | 6/2007 | Fujimoto | G06K 9/00798 |
| | | | | 382/104 |
| 2008/0147261 | A1 | 6/2008 | Ichinose et al. | |
| 2010/0070173 | A1* | 3/2010 | Sakamoto | G01C 21/20 |
| | | | | 701/533 |
| 2010/0222954 | A1 | 9/2010 | Ichinose et al. | |
| 2011/0238212 | A1* | 9/2011 | Shirado | G05D 1/0274 |
| | | | | 700/246 |
| 2015/0298621 | A1* | 10/2015 | Katoh | B60R 11/04 |
| | | | | 348/148 |

FOREIGN PATENT DOCUMENTS

| | | |
|---|---|---|
| JP | 2008-307658 A | 12/2008 |
| JP | 2009-151382 A | 7/2009 |
| JP | 2010-55498 A | 3/2010 |
| JP | 2010-61293 A | 3/2010 |
| JP | 2012-203646 A | 10/2012 |

OTHER PUBLICATIONS

Machine translation JP 2010-61293A (Year: 2010).*
Machine translation JP 2008-152504A (Year: 2008).*
Machine translation JP 2012-203646A (Year: 2012).*
Mar. 15, 2016 International Search Report issued in International Patent Application No. PCT/JP2015/085151.
Jun. 27, 2017 International Preliminary Report on Patentability issued in the International Patent Application No. PCT/JP2015/085151.

* cited by examiner

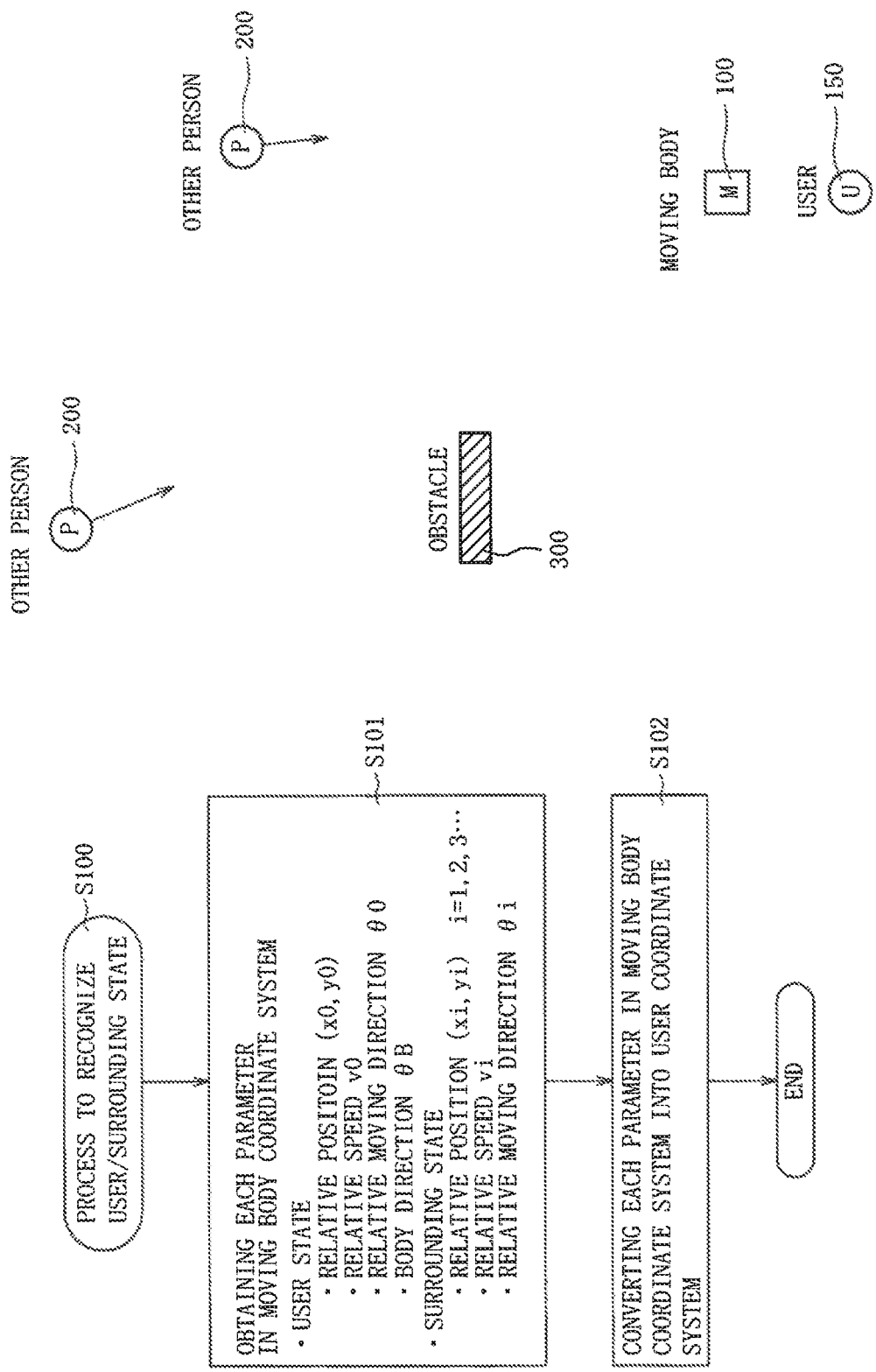

MOVING BODY

TECHNICAL FIELD

The present invention relates to a moving body, and in particular, to a moving body capable of showing an appropriate moving direction corresponding to a surrounding situation so that user can easily move.

BACKGROUND ART

Patent Literature 1 discloses a moving body which moves so as not to leave from a user while avoiding obstacles in surrounding area. Further, Patent Literature 2 discloses an autonomic moving device which moves between a user and dangerous materials in a case that contact of the user and the dangerous materials is predicted by predicting surrounding situation of the user.

CITATION LIST

Patent Literature

[PTL1] JP Laid-open Application Publication No. 2009-151382
[PTL2] JP Laid-open Application Publication No. 2008-307658

SUMMARY OF INVENTION

Technical Problem

However, in each technology disclosed in Patent Literature 1 and Patent Literature 2, there is no consideration for user's easiness to move against surrounding situation. Therefore, for example, although the moving body described in Patent Literature 1 can accompany with the user walking while avoiding obstacles without leaving from the user, since avoiding obstacles is entrusted to judgement by the user, it is possible for the user to contact with obstacles due to that the user cannot avoid obstacles. On the other hand, in the autonomic moving device described in Patent Literature 2, it is possible for the user himself/herself to contact with the autonomic moving device which moves between the user and dangerous materials.

The present invention has been done taking the above situation into consideration and has an object to provide a moving body capable of showing an appropriate moving direction to a user corresponding to surrounding situation so that the user can easily move.

Solution to Problem

In order to accomplish the above object, the moving body apparatus comprises: user detection device for detecting situation of a user; surrounding situation detection device for detecting surrounding situation; surrounding prediction device for predicting movement of object bodies existing in a surrounding area as future situation in the surrounding area based on the surrounding situation detected by the surrounding situation detection device; determination device for determining a moving direction shown to the user based on the future situation in the surrounding area predicted by the surrounding prediction device and the situation of the user detected by the user detection device; and showing device for showing to the user a direction corresponding to the moving direction determined by the determination device in the surrounding area in front of the user.

Advantageous Effects of Invention

According to the moving body apparatus described in the preceding paragraph, based on the surrounding situation detected by the surrounding situation detection device, the movement of the object bodies existing in the surrounding area is predicted as the future situation in the surrounding area by the surrounding prediction device. Based on the future situation in the surrounding area predicted by this surrounding prediction device and the situation of the user detected by the user detection device, the moving direction shown to the user is determined by the determination device and the direction corresponding to the determined moving direction is shown to the user in the surrounding area in front of the user by the showing device. Therefore, it can be obtained an effect that the suitable moving direction corresponding to the surrounding situation can be shown to the user. Here, the moving direction determined by the determination device is not limited to one direction and such direction includes a direction with a width within a predetermined range.

In the moving body apparatus, the determination device evaluates movement easiness of the user in the surrounding area based on the future situation predicted by the surrounding prediction device and the situation of the user detected by the user detection device and determines the moving direction shown to the user based on the movement easiness. According to these features, it can be obtained an effect as follows. The determination device evaluates movement easiness of the user in the surrounding area based on the future situation in the surrounding area predicted by the surrounding prediction device and the situation of the user detected by the user detection device and determines the moving direction shown to the user based on the movement easiness. Therefore, it can be obtained an effect that the suitable moving direction corresponding to the surrounding situation can be shown to the user so that the user can easily move.

In the moving body apparatus, the determination device comprises first evaluation device for evaluating the movement easiness of the user in the surrounding area based on the future situation in the surrounding area predicted by the surrounding prediction device and the situation of the user detected by the user detection device; and wherein the moving direction shown to the user is determined based on evaluation by the first evaluation device. According to these features, it can be obtained an effect as follows. The movement easiness of the user in the surrounding area is evaluated based on the future situation in the surrounding area predicted by the surrounding prediction device and the situation of the user detected by the user detection device by the first evaluation device. The determination device determines the moving direction shown to the user based on the evaluation by the first evaluation device. Therefore, it can be obtained an effect that the suitable moving direction corresponding to the surrounding situation can be shown to the user so that the user can easily move.

In the moving body apparatus, the determination device comprises: second evaluation device for evaluating flow of the object bodies in the surrounding area based on the future situation in the surrounding area predicted by the surrounding prediction device; wherein the moving direction shown to the user is determined based on the flow of the object bodies evaluated by the second evaluation device According to these features, it can be obtained an effect as follows.

Flow of the object bodies in the surrounding area is evaluated by the second evaluation device based on the future situation in the surrounding area predicted by the surrounding prediction device. The determination device determines the moving direction shown to the user based on the flow of the object bodies evaluated by the second evaluation device. Therefore, it can be obtained an effect that considering the flow of the object bodies, the moving direction suitable for the flow can be shown to the user.

The moving body apparatus includes a movement control device for moving the moving body in the surrounding area in front of the user based on the situation of the user detected by the user detection device; wherein the showing device shows the moving direction to the user by making the moving body move in the surrounding area in front of the user by the movement control device so that a direction corresponding to the moving direction determined by the determination device is shown. According to these features, it can be obtained an effect as follows. The showing device shows the moving direction to the user by making the moving body move in the surrounding area in front of the user by the movement control device so that a direction corresponding to the moving direction determined by the determination device is shown. Therefore, the user can easily move corresponding to the situation in the surrounding area by following the moving body in line with the movement of the moving body.

In the moving body apparatus, the determination device comprises candidate extraction means for extracting candidates of direction to determine the moving direction shown to the user based on the future situation in the surrounding area predicted by the surrounding prediction device, and wherein the moving direction shown to the user is determined based on the candidates extracted by the candidate extraction device. According to these features, it can be obtained an effect as follows. Candidates of direction to determine the moving direction shown to the user are extracted by the candidate extraction device based on the future situation in the surrounding area predicted by the surrounding prediction device. The determination device determines the moving direction shown to the user based on the candidates extracted by the candidate extraction device. Therefore, it can be obtained an effect that the suitable moving direction corresponding to the situation in the surrounding area can be shown to the user so that the user can easily move.

In the moving body apparatus, the candidate extraction device preferentially extracts a direction corresponding to flow not defying the moving direction of the user as the candidate among flows of the object bodies evaluated by the second evaluation device. According to these features, it can be obtained an effect as follows. A direction corresponding to the flow not defying the moving direction of the user is preferentially extracted by the candidate extraction device as the candidate among flows of the object bodies evaluated by the second evaluation device. Therefore, it can be obtained an effect that the moving direction corresponding to the flow not defying the moving direction of the user can be shown to the user.

In the moving body apparatus, the candidate extraction device preferentially extracts a direction corresponding to flow flowing with a speed difference in a predetermined range against moving speed of the user as the candidate among flows not defying the moving direction of the user. According to these features, it can be obtained an effect as follows. The direction corresponding to the flow flowing with a speed difference in a predetermined range against moving speed of the user is preferentially extracted by the candidate extraction device as the candidate among the flows not defying the moving direction of the user. Therefore, the flow not defying the moving direction of the user and flowing with a speed difference in a predetermined range is preferentially extracted by the candidate extraction device. Thus, based on that the user moves in the moving direction shown thereto, the user can follow the flow of the object bodies moving with a speed near the movement speed of himself/herself. Therefore, it can be obtained an effect that the user can easily move. Further, it can be obtained an effect that the speed difference is near the moving speed of the user and the moving direction corresponding to the flow along which the user easily moves can be shown to the user.

In the moving body apparatus, the surrounding prediction device predicts movement of the object bodies based on the surrounding situation detected by the surrounding situation detection device and an uncertain area where change in the future is uncertain based on blind spot by the object bodies existing in the surrounding area as the future situation in the surrounding area. According to these features, it can be obtained an effect as follows. The movement of the object bodies based on the surrounding situation detected by the surrounding situation detection device and an uncertain area where change in the future is uncertain based on blind spot by the object bodies existing in the surrounding area are predicted by the surrounding prediction device as the future situation in the surrounding area. Therefore, it can be obtained an effect that the moving direction along which the user easily moves can be shown by considering not only the movement of the object bodies existing in the surrounding area but also the uncertain area where change in the future is uncertain based on blind spot by the object bodies.

In the moving body apparatus, the surrounding prediction device predicts an area where the object bodies are able to exist after a predetermined prediction time as the movement of the object bodies. According these features, it can be obtained an effect as follows. An area where the object bodies are able to exist after a predetermined prediction time is predicted as the movement of the object bodies by the surrounding prediction device. Therefore, considering the area where the object bodies are able to exist after a predetermined prediction time, it can be obtained an effect that the moving direction along which the user easily moves can be shown.

In the moving body apparatus, the predetermined prediction time is a variable value corresponding to situation of each object body for each of the object bodies existing in the surrounding area. According to these features, it can be obtained an effect as follows. The predetermined prediction time is made a variable value corresponding to situation of each object body for each of the object bodies existing in the surrounding area. Therefore, it can be obtained an effect that the moving direction along which the user easily moves can be shown considering the area where the object bodies are able to exist after a predetermined prediction time by utilizing the prediction time corresponding to the situation of the object bodies.

In the moving body apparatus, the surrounding prediction device makes the object bodies relatively approaching to the user and the moving body an object and conducts prediction of the area for each of the object bodies becoming the object, and wherein the predetermined prediction time is a value based on a value corresponding to a distance between the user or the moving body and the object bodies and relative speed of the object bodies against the user or the moving body. According to these features, it can be obtained an effect as follows. The surrounding prediction device makes the object bodies relatively approaching to the user and the moving body an object among the object bodies existing in the surrounding area and the area where the object bodies are able to exist is predicted for each of the object bodies becoming the object by the surrounding prediction device. The predetermined prediction time is a value based on a value corresponding to a distance between the user or the moving body and the object bodies and relative speed of the object bodies against the user or the moving body. Therefore, it can be obtained an effect that the moving direction in which the relative position relation between the user and the moving body and the relative speed are considered can be shown for each object body having probability to contact with the user.

In the moving body apparatus, the predetermined prediction time is calculated as a time till a first area formed with a predetermined size in the surrounding area containing the user and the moving body when the user and the moving body and the object bodies approach with the relative speed of the object bodies against the user or the moving body and a second area formed with a predetermined size in the surrounding area of the object bodies reach a position where the first area and the second area separate with a predetermined room distance therebetween. According to these features, it can be obtained an effect as follows. The predetermined prediction time is calculated as a time till a first area formed with a predetermined size in the surrounding area containing the user and the moving body when the user and the moving body and the object bodies approach with the relative speed of the object bodies against the user and the moving body and a second area formed with a predetermined size in the surrounding area reach a position where the first area and the second area separate with a predetermined room distance therebetween. Therefore, since the state right before the moving body moving in the surrounding area in front of the user and the object bodies perfectly approach each other is predicted, not only the user easily moves but also the moving direction through which the object bodies are able to avoid the moving body with room can be shown to the user.

The moving body apparatus includes a path estimation device for estimating a path which is the hardest to receive influence by the object bodies till the user reaches a destination area when the user moves to the destination area determined corresponding to the user situation detected by the user detection device in a direction corresponding to the extracted direction as the candidate by the candidate extraction device in the future situation in the surrounding area predicted by the surrounding prediction device; wherein the first evaluation device evaluates that the user easily moves as a width between areas sandwiching the path becomes wider in a case that the areas sandwiching the path estimated by the path estimation device exist in the area predicted by the surrounding prediction device. According to these features, it can be obtained an effect as follows. It is estimated by the path estimation device the path which is the hardest to receive influence by the object bodies till the user reaches a destination area when the user moves to the destination area determined corresponding to the user situation detected by the user detection device in a direction corresponding to the extracted direction as the candidate by the candidate extraction device in the future situation in the surrounding area predicted by the surrounding prediction device. In a case that the areas sandwiching the path estimated by the path estimation device exist in the area predicted by the surrounding prediction device, it is evaluated by the first evaluation device that the user easily moves as a width between areas sandwiching the path becomes wider. Therefore, it can be obtained an effect that movement easiness of the user can be evaluated corresponding to the distance between areas sandwiching the path predicted by the surrounding prediction device for the path predicted by the path estimation device.

In the moving body apparatus, the first evaluation device evaluates that the user easily moves in a case that the width between the areas sandwiching the path is wider than a width of the first area formed with a predetermined size in the surrounding area containing the user and the moving body in comparison with a case that the width between the areas sandwiching the path is narrower than the width of the first area. According to these features, it can be obtained an effect as follows. In a case that the width between the areas sandwiching the path predicted by the path estimation device is wider than a width of the first area formed with a predetermined size in the surrounding area containing the user and the moving body, it is evaluated by the first evaluation device that the user easily moves in comparison with a case that the width between the areas sandwiching the path is narrower than the width of the first area. Therefore, it can be obtained an effect that the judgment result that the user can easily move can be obtained since interference within the first area decreases as the path easily passes the first area.

In the moving body apparatus, the width between the areas sandwiching the path is a length of line segment outside of the second area formed with a predetermined size around the object bodies corresponding to each area when connecting center of each area. According to these features, it can be obtained an effect as follows. The width between the areas sandwiching the path is a length of line segment outside of the second area formed with a predetermined size around the object bodies corresponding to each area when connecting center of each area. Therefore, it can be obtained an effect that movement easiness of the user can be judged taking into consideration interference against the second area by the user for the movement of the user.

The moving body apparatus includes a path estimation device for estimating a path which is the hardest to receive influence by the object bodies till the user reaches a destination area when the user moves to the destination area determined corresponding to the user situation detected by the user detection device in a direction corresponding to the extracted direction as the candidate by the candidate extraction device in the future situation in the surrounding area predicted by the surrounding prediction device; wherein the first evaluation device evaluates that the user easily moves as a terminal point of the path is nearer to a position where the moving direction indicated by the user situation detected through the user detection device and the destination area intersect among the paths estimated by the path estimation device. According to these features, it can be obtained an effect as follows. It is estimated by the path estimation device a path which is the hardest to receive influence by the object bodies till the user reaches a destination area when the user moves to the destination area determined corresponding to the user situation detected by the user detection device in a direction corresponding to the extracted direction as the candidate by the candidate extraction device in the future situation in the surrounding area predicted by the surrounding prediction device. Further, it is evaluated by the first evaluation device that the user easily moves as a terminal point of the path is nearer to a position where the moving direction indicated by the user situation detected by the user detection device and the destination area intersect among the paths estimated by the path estimation device. Therefore, it can be obtained an effect that the judgment result that the user can easily move can be obtained as the path has less deviation from a case that the user moves in the present moving direction.

The moving body apparatus includes a path estimation device for estimating a path which is the hardest to receive influence by the object bodies till the user reaches a destination area when the user moves to the destination area determined corresponding to the user situation detected by the user detection device in a direction corresponding to the extracted direction as the candidate by the candidate extraction device in the future situation in the surrounding area predicted by the surrounding prediction device; wherein the first evaluation device evaluates that the user easily moves as an absolute value of angle change of the moving direction from a start point of the path against the moving direction indicated by the user situation detected by the user detection device is smaller among the paths estimated by the path estimation device. According to these features, it can be obtained an effect as follows. It is estimated by the path estimation device a path which is the hardest to receive influence by the object bodies till the user reaches a destination area when the user moves to the destination area determined corresponding to the user situation detected by the user detection device in a direction corresponding to the extracted direction as the candidate by the candidate extraction device in the future situation in the surrounding area predicted by the surrounding prediction device. Further, it is evaluated by the first evaluation device that the user easily moves as an absolute value of angle change of the moving direction from a start point of the path against the moving direction of the user indicated by the user situation detected by the user detection device is smaller among the paths estimated by the path estimation device. Therefore, it can be obtained an effect that the judgment result that the user can easily move can be obtained as larger direction change is not conducted in the path at the present position of the user.

In the moving body apparatus, the surrounding prediction device predicts movement of the object bodies by utilizing moving speed of the user indicated by the user situation detected by the user detection device and predicts the movement of the object bodies by utilizing moving speed different from the moving speed of the user, wherein the candidate extraction device extracts candidates of direction to determine the moving direction shown to the user every moving speed of the user based on the future situation in the surrounding area including movement of the object bodies predicted every moving speed of the user by the surrounding prediction device, wherein the path estimation device estimates the path which is the hardest to receive influence by the object bodies every moving speed of the user, and wherein the first evaluation device evaluates that the user easily moves as the moving speed of the user utilized to predict the movement of the object bodies is nearer to the moving speed of the user indicated by the user situation detected by the user detection device among paths estimated every moving speed of the user by the path estimation device. According to these features, it can be obtained an effect as follows. It is predicted by the surrounding prediction device the movement of the object bodies by utilizing moving speed of the user indicated by the user situation detected by the user detection device and the movement of the object bodies by utilizing moving speed different from the moving speed of the user. It is extracted by the candidate extraction device the candidates of direction to determine the moving direction shown to the user every moving speed of the user based on the future situation in the surrounding area including movement of the object bodies predicted every moving speed of the user by the surrounding prediction device, and it is estimated by the path estimation device the path which is the hardest to receive influence by the object bodies every moving speed of the user. Further, it is evaluated by the first evaluation device that the user easily moves as the moving speed of the user utilized to predict the movement of the object bodies is nearer to the moving speed of the user indicated by the user situation detected by the user detection device among paths estimated every moving speed of the user by the path estimation device. Therefore, it can be obtained an effect that the judgment result that the user can easily move as the moving speed of the user nears a constant speed.

BRIEF DESCRIPTION OF DRAWINGS

FIG. 4 (a) is a flowchart showing a process in S100 and FIG. 4 (b) is a schematic view showing one example of surrounding situation in which a coordinate system is converted in a user coordinate system.

DESCRIPTION OF EMBODIMENTS

Figure 1:
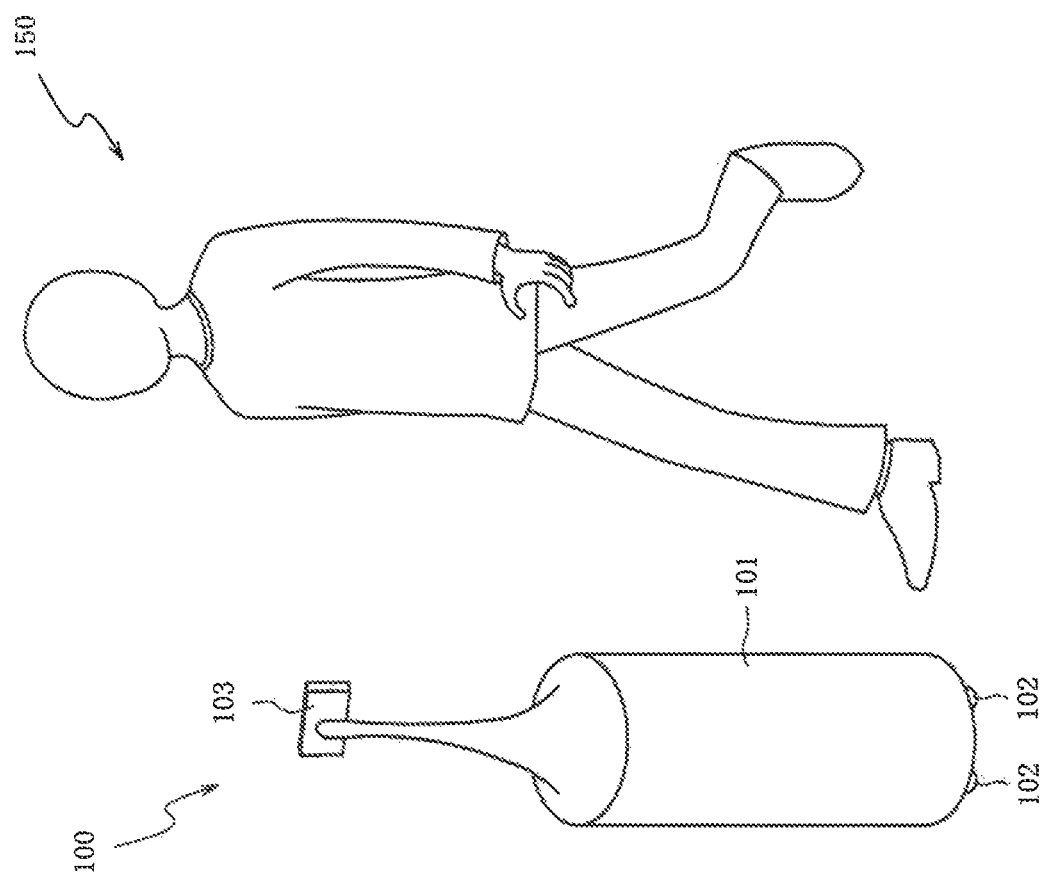
FIG. 1 is a schematic view of the moving body showing an outline thereof.

Hereinafter, the embodiments to embody the present invention will be described with reference to attached drawings. FIG. 1 is a schematic view showing an outline of a moving body 100 which is one embodiment of moving body of the present invention. The moving body 100 functions as a device to support movement of a user 150 by autonomously moving in front surrounding area of the user 150 who is moving.

The moving body 100 according to the present embodiment, for example, indicates to the user 150 a moving direction along which it is predicted that the user 150 will easily move under a surrounding situation of the moving body 100 and the user 150, thereby movement of the user 150 is supported. Here, in the present embodiment, as the movement of the user 150 supported by the moving body 100, it is assumed the movement that the user 150 moves with a speed to the extent of walking or tripping.

Here, "front surrounding area of the user 150" which corresponds to the moving range of the moving body 100 is, for example, a range existing in front of the user 150 and defined by a range of 180 degrees in a case that the user 150 is put at the center. Or such "front surrounding area of the user" may be defined within a range of the view of the user. Further, the distance between the moving body 100 and the user 150 is defined within a range which is more than a predetermined distance to be secured (for example, around 40 cm) from the user 150 and less than a distance set so as not to exceed a natural distance (for example, around 70 cm) at the point that the moving body 100 moves with the user 150.

As shown in FIG. 1, the moving body 100 possesses a main body unit 101, wheels 102 and a display unit 103. The main body 101 is formed in a substantial pillar shape. The shape of the main body unit 101 is not limited to a substantial pillar shape and various shapes may be adopted. Around the main body unit 101, it is provided a plurality of imaging devices (not shown) to image surrounding area of the user 150 or the moving body 100.

The wheels 102 are constructed as all direction wheels which are able to move in all directions. Therefore, the moving body 100 can smoothly move in all directions. In the present embodiment, although three wheels 102 are provided, the number of wheels 102 is not limited to three and voluntary number of wheels 102 can be adopted.

The display unit 103 has a display such as liquid crystal display device and the like and transmits information to the user 150 by displaying information on the display. Here, in the example shown in FIG. 1, the display of the display unit 103 is arranged on a plane opposing to the user 150. The display of the display unit 103 is constructed as a touch panel and instruction from the user 150 can be input to the moving body 100 by the touch panel.

Figure 2:
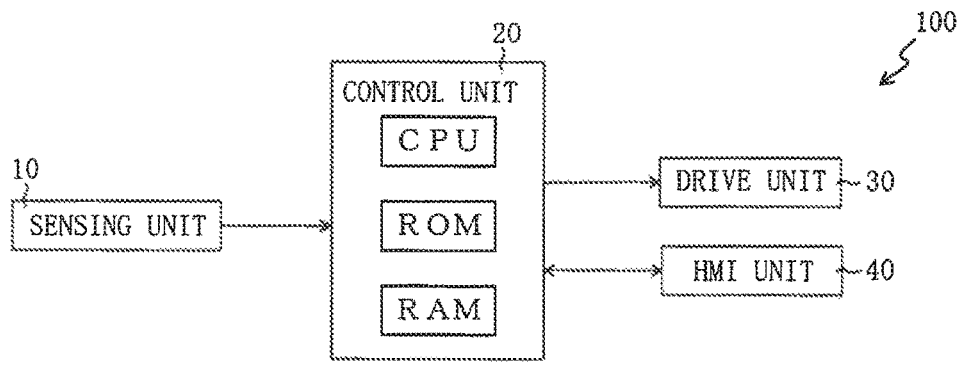
FIG. 2 is a block diagram showing a schematic electric structure of the moving body.

FIG. 2 is a block diagram showing a schematic electric construction of the moving body 100. The moving body 100 possesses a sensing unit 10, a control unit 20, a drive unit 30 and a human machine interface (abbreviated as "HMI" hereinafter) unit 40.

The sensing unit 10 detects state of the user 150 (abbreviated as "user state" hereinafter) or state of surrounding area of the moving body 100 or the user (abbreviated as "surrounding state" hereinafter). Among the sensing units 10, the sensing unit detecting the user state is one example of user detection device in the present invention. Among the sensing units 10, the sensing unit detecting the surrounding state is one example of surrounding situation detection device in the present invention.

The sensing unit 10 is, for example, constructed from a plurality of imaging devices or various sensor devices utilizing millimeter wave or laser and the like arranged around the main body unit 101. Here, as the imaging device, for example, it can be adopted camera device such as CCD (charge Coupled Device) camera or CMOS (Complementary Metal Oxide Semiconductor) camera. As the imaging device, the device having rangefinder may be adopted.

The sensing unit 10 outputs a result detected thereby to the control unit 20. In greater detail, the sensing unit 10 outputs to the control unit 20 an image targeting the user 150 and a detected result by radar and the like, as the detected result of the user state. On the other hand, the sensing unit 10 outputs to the control unit 20 an image taken so that image target becomes the surrounding area of the moving body 100 and the user 150 and a detected result by radar and the like, as the detected result of the surrounding state.

Figure 3:
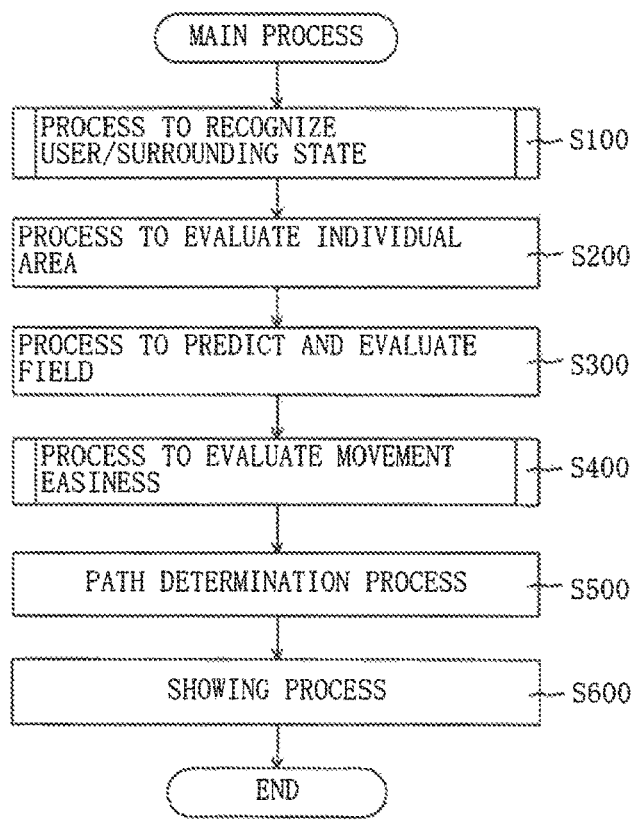
FIG. 3 is a flowchart showing a main process.

The control unit 20 is constructed from a CPU (Central Processing Unit), a ROM (Read Only Memory), a RAM (Random Access Memory) and the like and functions as a control device for controlling whole of the moving body 100. Here, a program to realize a process described hereinafter with reference to FIG. 3 is stored in the ROM of the control unit 20 and executed by the CPU of the control unit 20. The control unit 20 produces a control signal corresponding to input from the sensing unit 10 and outputs such control signal to the drive unit 30 or the HMI unit 40.

The drive unit 30 is constructed from wheels 102, a motor used as drive source of wheels 102 and the like. To the drive unit 30, the control signal is input from the control unit 20. When the control signal is input to the drive unit 30, the motor rotates based on the input signal, thereby the wheels 102 are driven by drive power produced through rotation of the motor.

The HMI unit 40 is an interface which outputs information to the user 150 and to which the user 150 inputs instruction. The display of the display unit 103 is one example of the HMI unit 40. Here, it may be a construction that a speaker for outputting sound or a microphone for inputting sound is provided as the HMI unit 40. The HMI unit 40 outputs information corresponding to the control signal input from the control unit 20. On the other hand, when the instruction is input to the HMI unit 40 by the user 150, the HMI unit 40 outputs the control signal corresponding to such input to the control unit 20.

FIG. 3 is a flowchart showing a main process that the CPU of the control unit 20 of the moving body 100 having the above construction executes according to the program stored in the ROM of the control unit 20. This main process is periodically executed every a predetermined time (for example, every 0.1 second). The CPU of the control unit 20 (abbreviated as "control unit 20" hereinafter) executes the process (S100) to recognize the user/surrounding state.

In the process of S100, based on the input from the sensing unit 10, each parameter represented in a moving body coordinate system (that is, the coordinate system using the moving body 100 as a reference) is converted into a user coordinate system (that is, the coordinate system using the user 150 as a reference). That is, the relative parameter based on the moving body 100 is converted in the relative parameter based on the user 150.

The control unit 20 executes the process to evaluate the individual area after the process of S100 (S200). The process S200 is the process to evaluate the individual area for the moving body 100, the user 150, and each of object bodies existing in the surrounding area. Although details thereof will be described with reference to FIGS. 5 and 6 hereinafter, the individual area is evaluated by scoring the individual area.

Here, "individual area" against a man such as the user 150 and the other person existing in the surrounding area is, so-called, psychological personal space which is the area that it is not felt favorably when the other person invades and that the other person does not feel inclined to invade. Further, "individual area" against the object bodies such as the moving body 100 and the obstacles existing in the surrounding area is the area that it is felt anxiety as if contact exists with the other person.

The control unit 20 executes the process to predict and evaluate the field (S300) after the process of S200.

The process of S300 is the process to predict future situation in the surrounding area of the user 150 and the moving body 100 and to evaluate the predicted future situation. The process of S300 is one example of the surrounding prediction device in the present invention.

Although details will be described hereinafter, in the present embodiment, for each of the other persons existing in the surrounding area, the moving area after the prediction time t will be predicted as one of future situations. On the other hand, for each of the other persons and each of obstacles existing in the surrounding area, based on blind spots thereof, the area uncertain in future change (hereinafter, abbreviated as "uncertain area") is predicted as one of future situations.

Each of the moving areas predicted as the future situation is scored considering existence probability of the other person corresponding to each of the moving areas, thereby each moving area is evaluated. On the other hand, each of the uncertain areas predicted as the future situation is scored considering size of blind spot of each uncertain area, thereby each uncertain area is evaluated. Further, it is formed a map in which evaluation for each predicted moving area and evaluation for each uncertain area are reflected, thereby the future situation in the surrounding area is totally evaluated.

The control unit 20 executes the process to evaluate movement easiness (S400) after the process of S300. The process of S400 is the process to evaluate movement easiness of the user 150 under the future situation predicted and evaluated in S300. The process of S400 is one example of the candidate extraction device and the first evaluation device in the present invention. Although detains will be described hereinafter, in the present embodiment, as for each direction extracted considering flow of the other person existing in the surrounding area, movement easiness of the user 150 in each direction is scored and evaluated based on the future situation predicted and evaluated in S300.

The control unit 20 executes the path determination process (S500) after the process of S400. In the process of S500, the moving direction most suitable for the user 150 is determined based on evaluation in S400. The process of S500 is one example of the determination device in the present invention. Although details will be described hereinafter, it is determined the most suitable moving direction for the user 150 considering both the score in each direction calculated in S400 and the score of area corresponding to each direction among the future situations predicted in S300.

The control unit 20 executes the showing process (S600) after the process of S500. In the process of S600, the moving direction determined in the process of S500 is shown to the user 150 by movement of the moving body 100. In the present embodiment, the moving body 100 moving in the front area of the user 150 is moved in the right and left direction against the user 150 by a distance indicating the determined moving direction, thereby the moving direction is shown to the user 150.

Concretely, the control unit 20 outputs a control signal to the drive unit 30 so that the moving body 100 indicates the moving direction determined in S500 and moves forward at the speed corresponding to the moving speed of the user 150. The drive unit 30 to which the control signal is input drives the wheels 102 so that the moving body 100 moves forward at the speed corresponding to the moving speed of the user 150 and moves to the right and left direction by a distance indicating the determined moving direction. Here, as the movement of the moving body 100 to the right and left direction, it can be exemplified a case to move the moving body 100 to the right and left direction while retaining a constant vertical distance with the user 150 in the user coordinate system or the moving body coordinate system or a case to move the moving body 100 to the right and left direction while retaining a constant relative distance with the user 150 (that is, a case to move arc trace center of which is set to the user 150 to the right and left direction). Thereby, the moving body 100 shows the moving direction estimated that the user 150 will easily move under the surrounding situation while moving forward with the user 150 by movement to the right and left direction to the user 150. The process of S500 is one example of the showing device and the movement control device in the present invention.

FIG. 4 (a) is a flowchart showing the process (S100) recognizing the above user/surrounding state. The control unit 20 obtains the parameters in the moving body coordinate system based on the input from the sensing unit 10 (S100). The parameters obtained in S100 are roughly classified into the parameters indicating the user state and the parameters indicating the surrounding state.

The parameters indicating the user state include, for example, relative position (x0, y0) of the user 150 against the moving body 100, relative speed v0 of the user 150 against the moving body 100, relative moving direction θ0 of the user 150 against the moving body 100, body direction θB of the user 150 against the moving body 100 and the like.

Here, although details will be described hereinafter, in the present embodiment, in order to consider a case that the moving speed of the user 150 changes from the present value (that is, value based on input value input this time from the sensing unit 10), it is separately obtained a value which is changed by a predetermined amount from the present value of the moving speed of the user 150, in addition to the value indicating the present moving speed as the relative speed v0 and obtained based on input from the sensing unit 10. In the present embodiment, in order to consider three kinds of moving speed such as the present moving speed, the moving speed with ±2 km/h from the present speed as the moving speed of the user 150, the relative speed v0 is respectively obtained for each moving speed.

On the other hand, the parameters indicating the surrounding state include, for example, relative position (xi, yi) of the other person or obstacle against the moving body 100, relative speed vi of the other person or obstacle against the moving body 100, relative moving direction θi of the other person or obstacle against the moving body 100 and the like. Here, variable i is an integer of 1 or more and is individually allotted to the other person or obstacle existing in the surrounding area. That is, the variable i is a value to individually specify the other person or obstacle existing in the surrounding area.

The relative position of the user 150 or the other person or obstacle existing in the surrounding area and the body direction of the user 150, for example, can be obtained by conducting image process for each of images imaged by a plurality of imaging devices (for example, cameras) arranged in the surrounding area of the main body unit 101 and edge extraction or pattern recognition.

Here, for example, recognition whether a person is the user or not is conducted by storing face image of the user beforehand and comparing the face image with the image obtained. Distinction whether the object existing in the surrounding area is the moving other person or static obstacle is also conducted based on the imaged images. On the other hand, the relative speed and the relative moving direction of the user 150 or the other person or the obstacle existing in the surrounding area are, for example, obtained based on each of images obtained this time and each of images obtained at previous time.

The control unit 20 converts each parameter in the moving body coordinate system obtained in S101 into the user coordinate system (S102). FIG. 4 (b) is a schematic view showing one example of the surrounding state converted into the user coordinate system. As shown in FIG. 4 (b), the control unit 20 grasps the relative position, the relative speed and the relative moving direction against the user 150 for each other person 200 existing in the surrounding area from each parameter converted into the user coordinate system. In the example shown in FIG. 4 (b), the relative moving direction and the relative speed against the user 150 are respectively represented by direction and length of the vector.

On the other hand, in the present embodiment, as for the obstacle 300, that is, the object which stands still itself, only the relative position against the user 150 is considered and the relative speed and the relative moving direction are not considered. Therefore, the control unit 20 grasps the relative position against the user 150 for each obstacle 300 existing in the surrounding area from each parameter converted into the user coordinate system.

Here, in the FIG. 4 (b), although two other persons 200 and one obstacle 300 are shown as a simple example, the control unit 20 actually considers a plurality of the other persons 200 as the object bodies and grasps the relative position, the relative speed and the relative moving direction against the user 150 for each other person 200. Further, the control unit 20 actually considers a plurality of obstacles 300 as the object bodies and grasps the relative position against the user 150 for each obstacle 300.

Figure 5A:
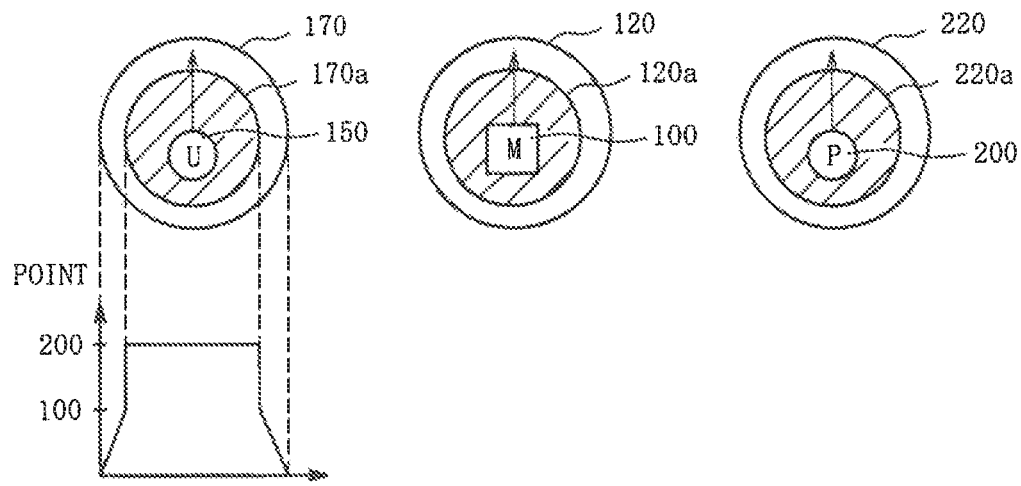
FIG. 5 (a) and FIG. 5 (b) are views to explain an individual area evaluated in S200.
Figure 5B:
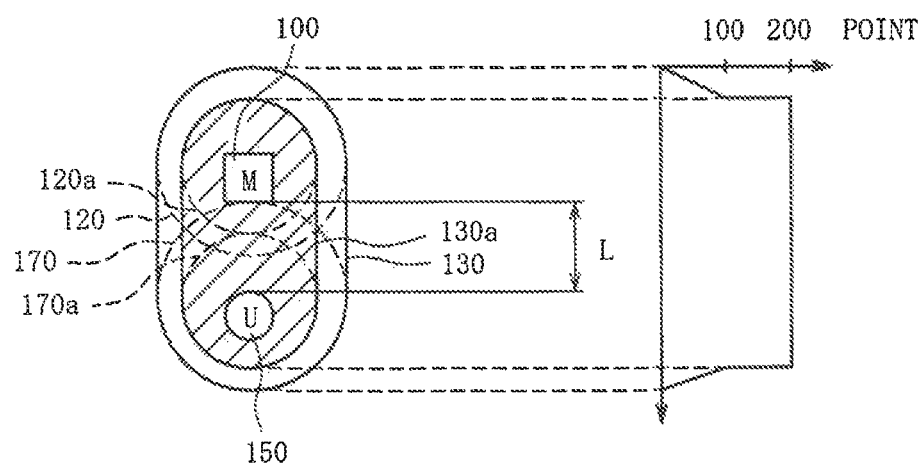

Referring with FIG. 5 and FIG. 6, in the present embodiment, the individual area evaluated in S200 mentioned above will be described. As shown in FIG. 5 (a), the individual area 120, 170 and 220 are respectively set for the moving body 100, the user 150 and the other person 200. In the individual area 170 for the user 150, the front area (arrow direction extended from the user 150) corresponding to the moving direction of the user 150 is set wider than the rear area. The individual areas of the moving body 100 and the other person 200 are similarly set to the above case of the user 150.

In the example shown in FIG. 5 (a), although the individual area 120, 170 and 220 against each of the moving body 100, the user 150 and the other person 200 are represented by circle, suitable shape such as ellipse and the like may be adopted. Further, although each of the individual area 120, 170 and 220 is set in the same size, it is not necessary to set in the same size. For example, the individual area 120, 170 and 220 may be set in the different size corresponding to the moving speed of the moving body 100, the user 150 and the other person 200. Furthermore, the area set at the front of the moving body 100, the user 150 and the other person 200 and wider than the rear area may be set in the area corresponding to the moving speed of the moving body 100, the user 150 and the other person 200.

The individual areas 120, 170 and 220 are evaluated by the score set so that the score becomes the maximum value within the exclusive area 120a, 170a and 220a formed in each of the area 120, 170 and 220 and gradually becomes lower as going to the periphery. Here, the exclusive area 120a, 170a and 220a is the area to exclude the object bodies so as not to enter therein.

In the example shown in FIG. 5 (a), the maximum value (200 points in the present embodiment) capable of setting as the score of the individual area is set to the exclusive area 170a and the score, which is represented by linear function that the score linearly goes down from 100 to 0, is set to the area from the periphery of the exclusive are 170a to the periphery of the individual area 170. Although not shown in Figures, the score is set to the individual area 120, 220, similarly to the case of the individual area 170.

Concerning the "score" of the individual area in the present description, it indicates that tolerance is high against approach of the object when the score becomes lower and it indicates that tolerance is low against approach of the object bodies when the score becomes higher. Here, suitable value may be adopted as the score of the maximum value without being limited to 200 score. Further, as for the function for setting the score from the periphery of the exclusive area 170a to the periphery of the individual area 170, it is not limited to the linear function and suitable function in which the score decreases toward the periphery may be adopted. Furthermore, such function may be different corresponding to that the individual area is set to which of the moving body 100, the user 150 and the other person 200.

Since the moving body 100 and the user 150 move together, both can be considered as one. Thus, as shown in FIG. 5 (b), the individual area 130 is set. In the present embodiment, it is supposed that the user 150 and the moving body 100 position with the distance L to be secured therebetween and the area including the individual area 120, 170 in such case is set as the individual area 130. Here, in the example shown in FIG. 5 (b), although the oval form area including the individual area 120, 170 is set to the individual area 130, the individual area 130 may be an ellipse form area in which both sides are swelling in the right and left direction when the individual area 120, 170 is included.

In the present embodiment, although the distance L to be secured is a distance between the user 150 and the moving body 100 in a case that the individual area 170 of the user 150 contacts with the moving body 100 existing in the front, it is not limited to this and it can be adopted a suitable distance through which the user 150 and the moving body 100 are not so close and not so separate.

In the individual area 130, the exclusive area 130a is provided. The exclusive area 130a is the area in which the object bodies are excluded so as not enter, similar to the exclusive area 120a, 170a and 220a. In the example shown in FIG. 5 (b), although the oval form area including the exclusive area 120a, 170a is set to the exclusive area 130a, the exclusive area 130a may be an ellipse form area in which both sides are swelling in the right and left direction when the exclusive area 120a, 170a is included Similar to the individual area 120, 170 and 220, in evaluation of the individual area 130, the maximum score is set in the exclusive area 130a and the score gradually becoming lower is set toward the periphery. In the example shown in FIG. 5 (b), 200 points which is the maximum value as points is set for the exclusive area 130a and the score, which is represented by linear function that the score linearly goes down from 100 to 0, is set to the area from the periphery of the exclusive are 130a to the periphery of the individual area 130. As for the function to set score from the periphery of the exclusive area 130a to the periphery of the individual area 130, it is not limited to the linear function and suitable function in which the score decreases toward the periphery may be adopted.

Figure 6:
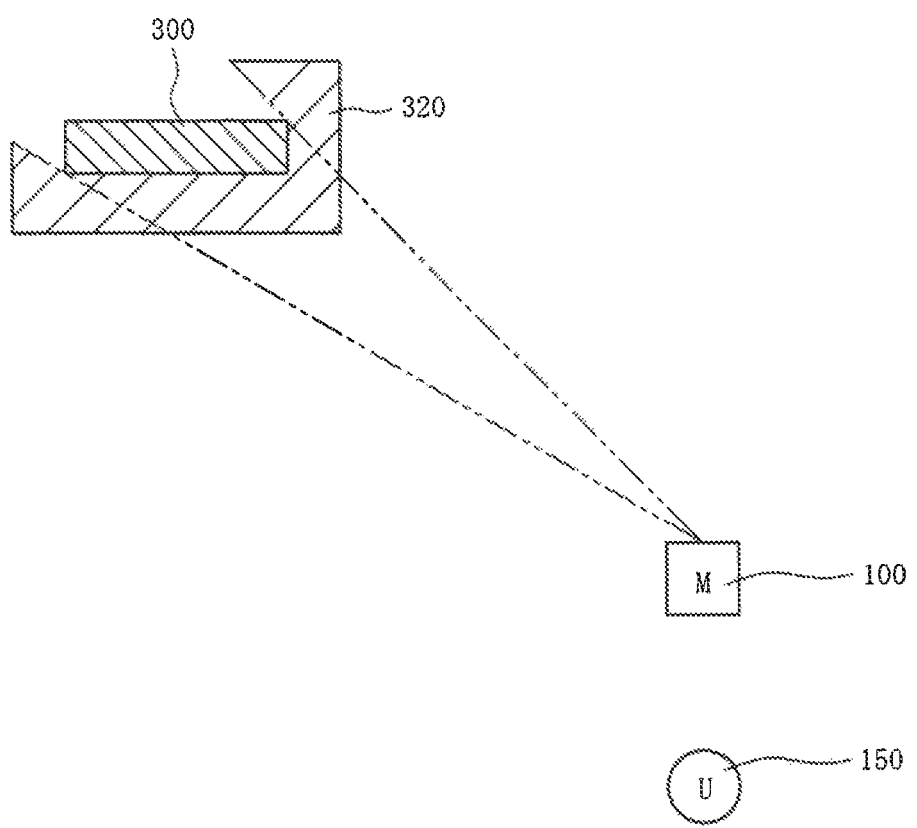
FIG. 6 is a view to explain an individual area evaluated in S200.

As shown in FIG. 6, against the obstacle 300, it is set as the individual area 320 the area which separates by a predetermined distance from the obstacle 300 and which can be seen from the moving body 100. In the present embodiment, it is supposed that the individual area 320 is constructed only from the exclusive area in which the object is excluded so as not to enter. Therefore, 200 points which is the maximum value as points are set over entire area for the individual area 320. Here, similar to the individual area 120 and the like, the individual area 320 may be constructed from the exclusive area and the area in which the score becomes lower than the exclusive area.

Figure 7:
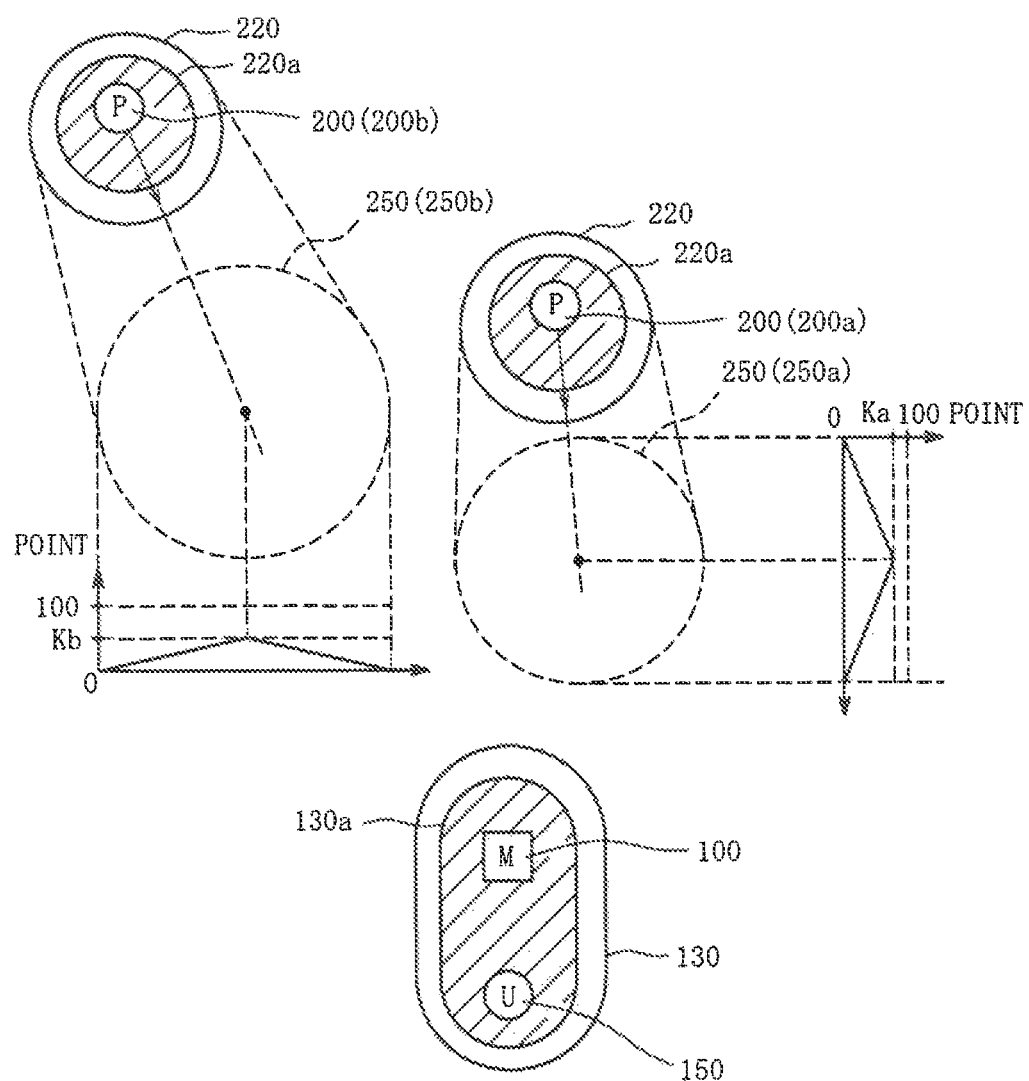
FIG. 7 is a view to explain prediction and evaluation conducted in S300.
Figure 8:
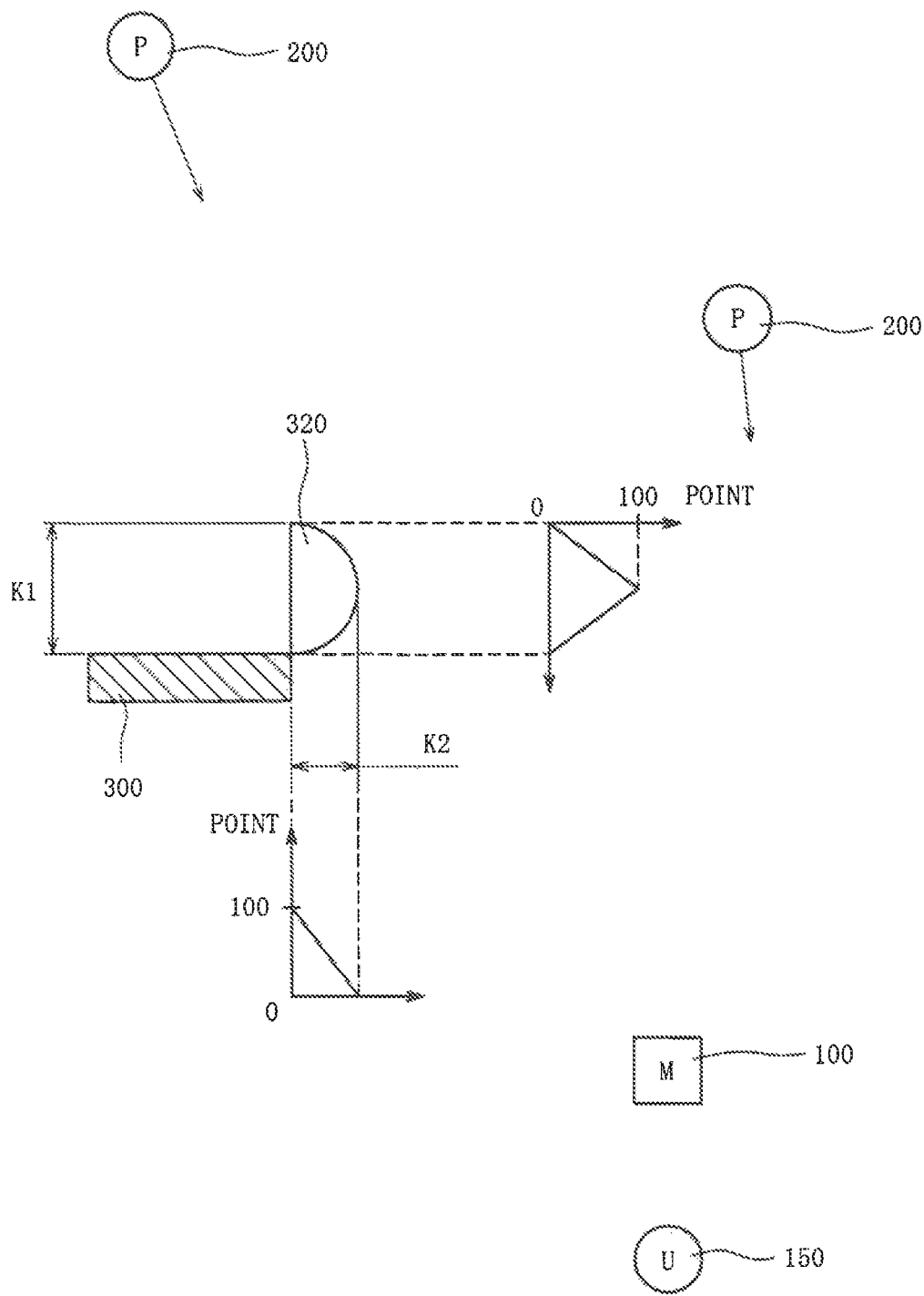
FIG. 8 is a view to explain prediction and evaluation conducted in S300.

Referring to FIG. 7 and FIG. 8, in the present embodiment, prediction and evaluation conducted in above S300 will be described. As mentioned in the above, in the present embodiment, for each of the other persons 200 existing in the surrounding area, movement area after the prediction time t is predicted as one of the future situation and each of the predicted movement area is evaluated by the score. Here, concerning "score" of the future situation in the present description, it indicates that the user 150 is easily moves as the score becomes lower.

In S300, in order to predict the movement area for each of the other persons 200 existing in the surrounding area, the control unit 20 first calculates the prediction time t for each of the other persons 200 existing in the surrounding area. The prediction time t is calculated from $(\Delta x-\alpha)/\Delta v$. Here, $\Delta v$ is a value larger than 0.

$\Delta x$ is a distance between the other person 200 and the moving body 100. $\Delta v$ is the relative speed of the other person 200 in the user coordinate system. As mentioned above, since the $\Delta v$ is set to a value larger than 0, the prediction time t is calculated only for the other person 200 relatively moving against the moving body 100 and the user 150.

$\alpha$ is a room distance. The room distance is a distance set supposing that the other person 200 and the moving body 100 do not approach exceeding some extent in a case that both the moving body 100 and the user 150 and the other person 200 approach along a line connecting the other person 200 and the moving body 100. In the present embodiment, the room distance is set to the distance between the other person 200 and the moving body 100 when the exclusive area 220a and the exclusive area 170a separate by a predetermined distance (for example, 1 m).

Therefore, the prediction time t is calculated as a time till the other person 200 and the moving body 100 and the user 150, that is, the exclusive area 220a and the exclusive area 170a reach to a position that the exclusive area 220a and the exclusive area 170 separate by a predetermined distance (for example, 1 m) when both the moving body 100 and the user 150 and the other person 200 approach along the line connecting the other person 200 and the moving body 100. Thus, the prediction time t depends on the position of the other person 200 and the moving speed, therefore the prediction time t is made a variable value corresponding to the situation of each of the other persons 200.

Next, the control unit 20 predicts the movement area 250 after the prediction time t for each of the other persons 200 existing in the surround area when each of the other persons 200 moves along the present moving direction. Here, as mentioned above, the prediction time t is a value calculated every other person 200 as the other person 200 relatively approaching to the moving body 100 and the user 150 is the object. Each movement area 250 is predicted as a circle the center of which exists on the line of the moving direction of the other person 200. Existence probability of the other person 200 after the prediction time t becomes higher as closer to the center.

Here, since the room distance is considered in calculation of the prediction time t as mentioned above, the predicted movement area is the area where the other person 200 does not enter in the exclusive area 170a for the user 150 and where the moving body 100 and the user 150 do not enter in the exclusive area 220a for the other person 200. Therefore, for movement of the user 150, it is considered so that load taken for the other person 200 becomes as small as possible.

Next, the control unit 20 evaluates the movement area 250 predicted for each of the other persons 200. In the present embodiment, the score is set as linear function that the score linearly goes down from a predetermined value 0 or more to 0 toward the periphery from the center of the movement area 250. As the "score" of the movement area in the present description becomes higher, it indicates that the existence probability of the other person becomes higher. In the present embodiment, 100 points is allotted for 100% of the existence probability. Therefore, "score" of the movement area is set to the score equal to the value of the existence probability.

In the present embodiment, the score of the center of the movement area 250 is set to a value of the existence probability in the center. Therefore, for example, as shown in FIG. 7, when the existence probability in the center of the movement area 250a for the other person 200a is higher than the existence probability in the center of the movement area 250b for the other person 200b, the score Ka set to the center against the movement area 250a becomes higher than the score Kb set to the center against the movement area 250b.

Here, the value set to the center of the movement area 250 is not limited to the value of the existence probability in the center and suitable value corresponding to the existence probability may be adopted. Further, as for the function to set the score from the center of the movement area 250 to the periphery, such function is not limited to linear function so long as such function decreases from the center toward the peripheral and suitable function may be adopted. Furthermore, such function may be different corresponding to individual situation of the other person 200.

In the present embodiment, considering that the moving speed of the user 150 changes, the movement area 250 is respectively predicted after prediction time t for each of the other persons 200, corresponding to each pattern for the present moving speed of the user 150 and the moving speed different from the present moving speed. In the present embodiment, change width of the moving speed of the user 150 is set to a range of −2 km/h to +2 km/h and the moving speed of the user 150 is changed by 2 km/h within the change width set in above. That is, prediction and evaluation of the moving area 250 for each of the other persons 200 are conducted in three patterns of the present moving speed of the user 150, the speeds of ±2 km/h from the present moving speed.

Here, when the moving speed of the user is changed, the prediction time t is calculated at the relative speed corresponding to the moving speed of the user. Therefore, as the moving speed of the user becomes faster, the prediction time t becomes longer. Thus, the movement area for each of the other persons 200 positions at the separate side (that is, side near the user 150) from the other person 200 than the moving area 250 shown in FIG. 7 and becomes wider than the moving area 250 shown in FIG. 7.

Further, as mentioned above, in the present embodiment, as for each of the other persons 200 and each of the obstacles 300 existing in the surrounding area, the uncertain area corresponding to the blind spots thereof is predicted as one of the future situation and the predicted uncertain area is evaluated by the score. Therefore, the control unit 20 first predicts the uncertain area.

For example, as shown in FIG. 8, the control unit 20 predicts the uncertain area 320 in the area adjacent to the blind spot area for the blind spot formed backside of the obstacle 300. In this example, although the uncertain area 320 is a semicircle in which the vertical width K1 is made twice as the width K2, ratio of the vertical width K1 and the width K2 is not limited to 2:1. Further, whole shape of the uncertain area 320 is not limited to a shape which is a part of circle such as semicircle and the like and the uncertain area 320 with a suitable shape can be adopted.

Next, the control unit 20 evaluates the predicted uncertain area. In the example shown in FIG. 8, 100 points is set to the center of the vertical width K1 of the uncertain area 320 and the score is set by linear function according to which the score linearly goes down toward the periphery from the center position. Further, the score is set by linear function according to which the score linearly goes down toward the periphery from the end of the obstacle side with width K2 of the uncertain area 320.

As for evaluation of the uncertain area 320, it is not limited to this and it can be done evaluation corresponding to the shape and the like of the obstacle 300 in a case that it is satisfied the condition that the score is set higher as the position has larger uncertainty in the uncertain area 320 and the score is set lower as the position approaches to the periphery. Further, the maximum value of the score in the uncertain area 320 is not limited to 100 points and various values can be adopted.

Here, similar to the uncertain area 320 against the obstacle 300, the control unit 20 also conducts prediction and evaluation of the uncertain area corresponding to the blind spot formed by the other person 200 existing in the surrounding area. When predicting the uncertain area for the other person 200 existing in the surrounding area, size of the uncertain area is changed corresponding to the number of the other person 200 forming the blind spot. For example, in a case that a plurality of the other persons 200 superimpose and form the blind spot, it is predicted as the uncertain area the area larger than the uncertain area for the blind spot formed from one other person 200.

In S300, various future situations are predicted and evaluation for the future situations is conducted, thereby it is formed a map (hereinafter, abbreviated as "evaluation map") on which evaluation of each future situation is reflected. Here, evaluation for the individual area 320 against the obstacle 300 is also reflected on the evaluation map. Therefore, in the present embodiment, it is formed the evaluation map on which evaluation for the movement area predicted against the other person 200 and evaluation for the uncertain area corresponding to the blind spot are reflected as evaluation of the future situation and evaluation for the individual area 320 against the obstacle 300 is reflected.

Here, as mentioned above, in the present embodiment, since prediction of the movement area for the other person 200 is conducted for three patterns that the present moving speed of the user 150, the speed with ±2 km from the present moving speed are considered, evaluation of the future situation for each pattern is done. That is, maps for three patterns corresponding to the moving speed of the user 150 are formed as the evaluation map.

Figure 9:
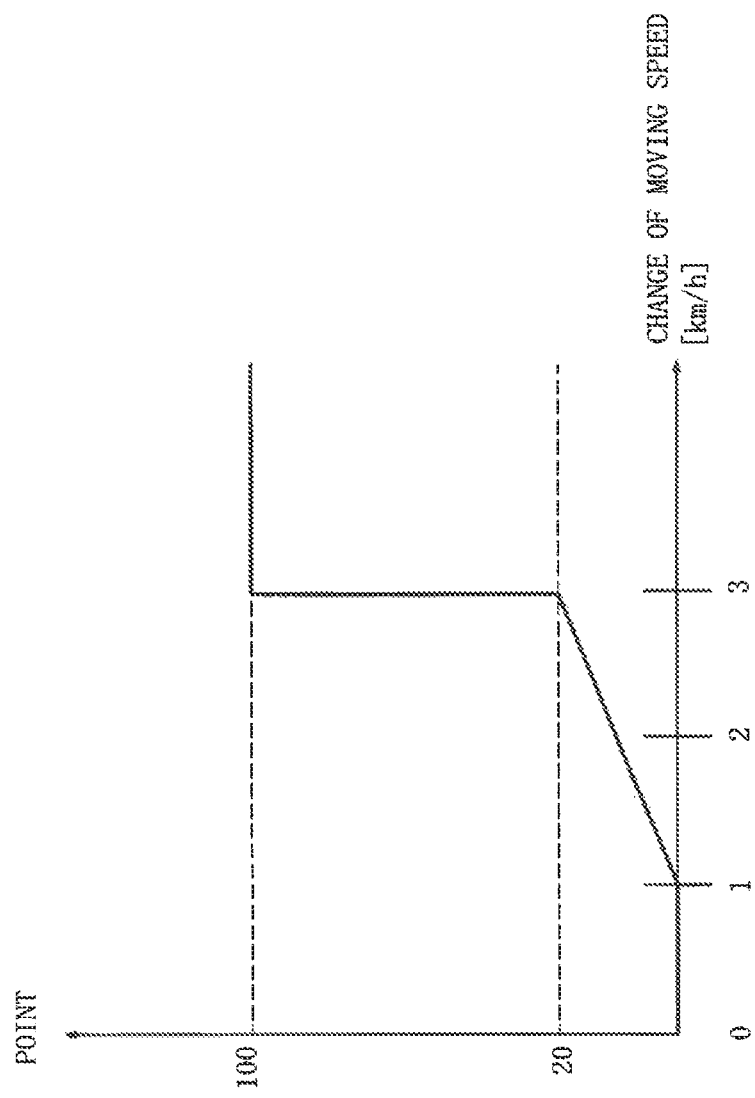
FIG. 9 is a view to explain evaluation for change of a moving speed of the user.

To the map for each pattern, evaluation corresponding to the moving speed of the user 150 is added. It is shown in FIG. 9 one example indicating relation of change amount from the present moving speed of the user 150 and evaluation score. In the example shown in FIG. 9, in a case that change amount from the present moving speed is 0 km/h to 1 km/h, evaluation score is made 0 point which is the minimum value in evaluation of change of the moving speed of the user. That is, when change in the moving speed is 1 km/h or less, it is evaluated that such change in the moving speed does not influence on movement easiness of the user 150.

When change amount from the present moving speed lies in a range of 1 km/h to 3 km/h, evaluation score rises up according to linear function as a value of change amount becomes larger, namely, the moving speed of the user 150 becomes faster. At the time that change amount from the present moving speed is 3 km/h, evaluation score is made 100 points which is the maximum value in evaluation of change of the moving speed of the user. That is, when change in the moving speed becomes 3 km/h or more, it is evaluated that movement easiness of the user 150 according to change of the moving speed becomes the minimum (that is, the most difficult to move).

After evaluating the score corresponding to change amount from the present moving speed of the user 150, the evaluated score is added to entire area of the evaluation map. Here, when relation between change amount of moving speed of the user 150 and the evaluated score satisfies a condition that the evaluation score becomes higher as change amount of the moving speed becomes larger than 0, various relations can be adopted without limiting to the relation shown in the example of FIG. 9.

Figure 10:
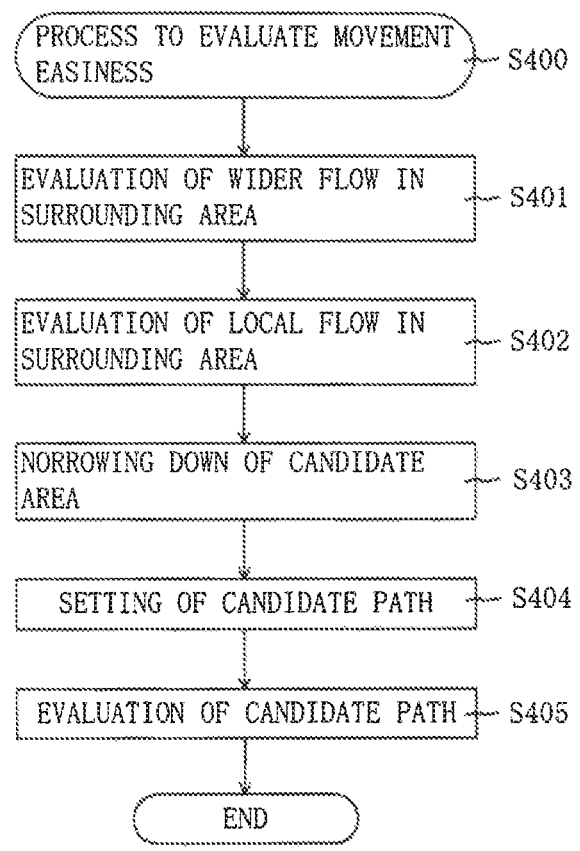
FIG. 10 is a flowchart showing a process in S400.

FIG. 10 is a flowchart indicating the process (S400) to evaluate the movement easiness described above. Here, while describing the flowchart of FIG. 10, FIGS. 1 to 16 will be referred as needed. The control unit 20 evaluates wider flow in the surrounding area (S401). The process in S401 is one example of the second evaluation device in the present invention.

"Wider flow" is not individual flow formed based on that each of the other persons 200 moves but general flow formed based on each of the other persons 200 individually moves. Therefore, in some cases, the moving direction of the other person 200 will be a reverse direction against the flow direction of the wider flow including the other persons 200.

In S401, the control unit 20 first judges whether or not the wider flow exists based on density of the flow calculated from the relative position, the relative speed and the relative moving direction and the like of each of the other persons 200 in the user coordinate system. The density of the flow is, for example, calculated corresponding to degree of superimposition of the relative moving direction of the other person 200 per unit area.

Next, the control unit 20 narrows down the flow direction considering the flow direction and strength of the wider flow, distance among the such flow and both the user 150 and the moving body 100 and the like, when it is judged that the wider flow exists. For example, first opportunity is taken for the flow with the direction separating from the user 150 and the moving body 100. On the other hand, the flow with the direction opposite to the user 150 and the moving body 100 is excluded.

Further, among the flows separating from the user 150 and the moving body 100, first opportunity is taken for stronger flow. Therefore, for example, when the strong slow exists in the direction separating from the user 150 and the moving body 100, remaining other flows are excluded. When some extent of flow exists near the user 150 and the moving body 100, such flow is excluded even if strong flow exists in the distance.

For the narrowed down flow, the control unit 20 sets movement destination area (hereafter, this area is abbreviated as "first movement destination area") to ride on such flow. The first movement destination area is an area where the user 150 and the moving body 100 can reach with shorter movement distance and fewer turns when riding on the flow. Based on that the first movement destination area is set, candidates of the moving direction of the user 150 and the moving body 100 to ride on the wider flow are set within some extent of an angle range (for example, 0-10 degrees) as the direction forward the first movement destination area from the present position.

The control unit 20 evaluates local flow in the surrounding area (S402) after the process of S401. "Local flow" is flow occurring when each of the other persons 200 individually moves. Concretely, the control unit 20 conducts evaluation of the local flow corresponding to the relative speed of each of the other persons 200 in the user coordinate system. The process in S402 is one example of the second evaluation device in the present invention.

For example, it is evaluated that the user 150 can easily walk in a case that the relative speed of the other person 200 against the user 150 is 0 or more (that is, a situation that the other person 200 positioning at the front of the user 150 relatively separates from the user 150), in comparison with a case that the relative speed of the other person 200 against the user 150 is negative value (that is, a situation that the other person 200 positioning at the front of the user 150 relatively approaches to the user 150). In the present embodiment, the local flow through each of the other persons 200 is evaluated by scoring corresponding to the relative speed of the other person 200 in the user coordinate system. Evaluation score for the local flow is added to the score for the movement area predicted and evaluated in S300 against each of the other persons 200.

Figure 11:
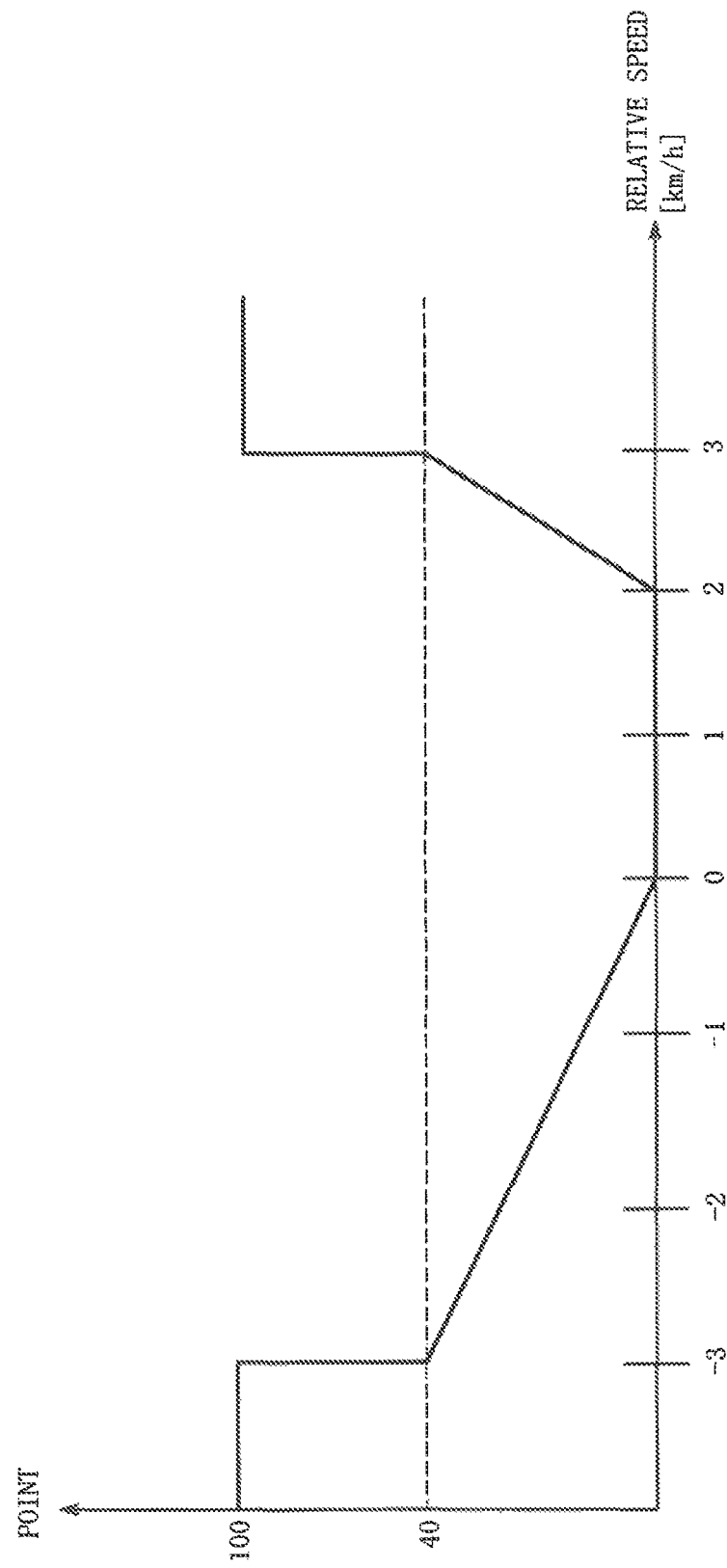
FIG. 11 is a view to explain evaluation conducted in S402.

One example of relation between the relative speed of the other person 200 in the user coordinate system and the evaluation score will be indicated in FIG. 11. In the example shown in FIG. 11, when the relative speed of the other person 200 against the user 150 in the user coordinate system lies in a range of 0 to 2 km/h, the evaluation score is 0 point which is the minimum value in evaluation of the local flow. On the contrary, when the relative speed of the other person 200 against the user 150 is negative value, the evaluation score is a score larger than 0. This is because when the user 150 moves while following with the other person 200 who moves in front of the user 150 in the same direction as the user 150 with the same speed as the user 150 or faster speed to some extent than the user 150, the user easily moves.

When the relative speed of the other person 200 against the user 150 is negative value and such relative speed lies in a range of 0 to −2 km/h, the evaluation score rises up according to linear function as absolute value of the relative speed becomes larger, that is, the speed that the other person 200 existing in front of the user 150 approaches the user 150 becomes faster. At the time that the relative speed becomes −3 km/h, the evaluation score becomes 100 points which is the maximum value in evaluation of the local flow. That is, when the other person 200 approaches the user 150 with the speed 3 km/h or more, it is evaluated that movement easiness of the user 150 for the local flow by the other person 200 becomes the minimum (that is, the most difficult to move).

When the relative speed of the other person 200 against the user 150 is +2 km/h or more, the score is a value more than 0. This is because even if the user 150 moves following with the other person 200 who goes away with the speed more than some extent in front of the user 150, it does not conclude that the user can easily move in particular.

Here, the relation between the relative speed of the other person 200 in the user coordinate system and the evaluation score is not limited to the relation shown in the example of FIG. 11 when it is satisfied the condition that the evaluation score is lower in comparison with a case that the relative speed of the other person 200 against the user 150 is negative value when the relative speed is 0 or more. Various relations may be adopted. The evaluation score in a case that the relative speed is 0 or more may be made constant. Further, although the maximum value capable of taking in a case that the relative speed is +2 km/h or more is made the maximum value in evaluation of the local flow, a smaller value than the maximum value may be used.

Figure 12A:
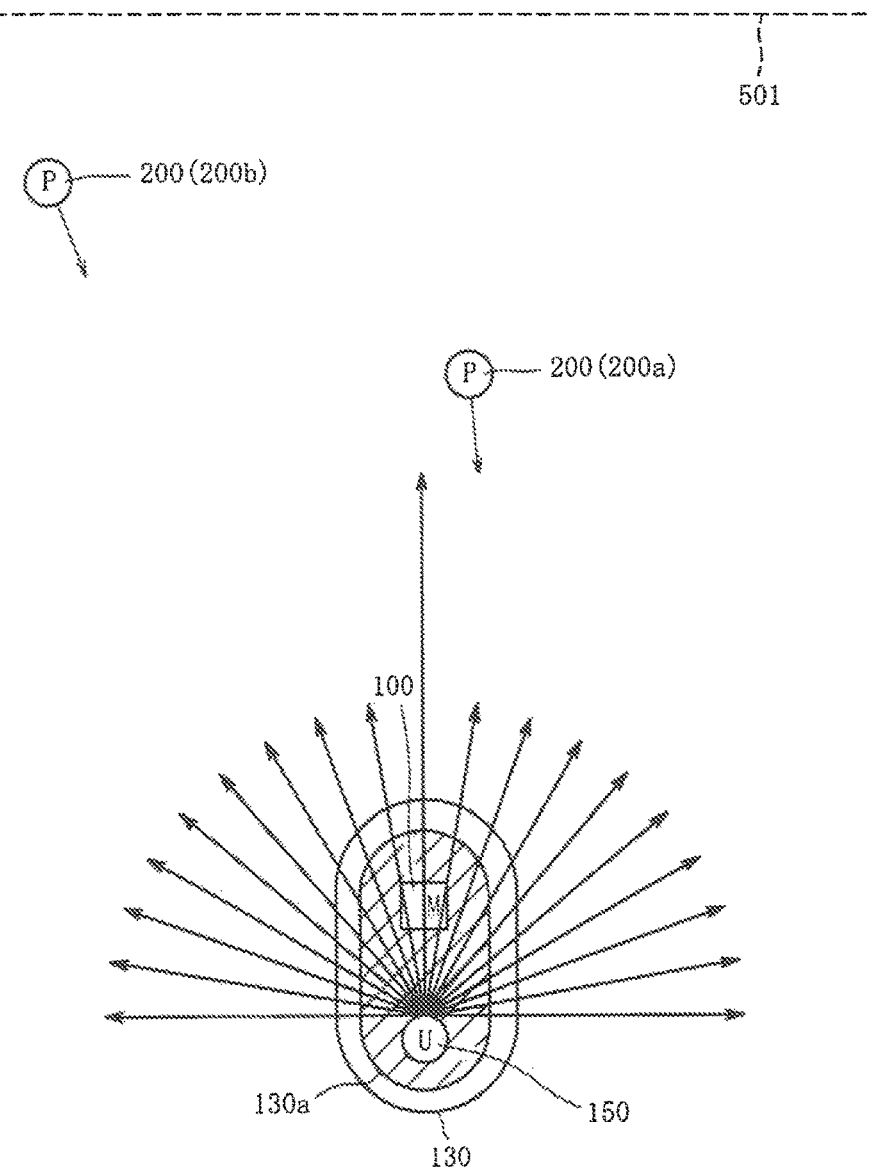
FIG. 12 (a) and FIG. 12 (b) are views to explain narrowing down of candidate area conducted in S403.
Figure 12B:
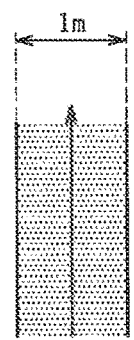

Description returns to FIG. 10. The control unit 20 narrows down the candidate areas after the process of S402 (S403). The process in S403 is one example of the candidate extraction device in the present invention. In S403, the control unit 20 first divides the range of 180 degrees in front of the user 150 to set with the user 150 as a reference in increments of a predetermined angle against the evaluation map obtained based on evaluation in S300 (that is, map on which evaluation of future situation in the surrounding area is reflected). For example, as shown in FIG. 12 (*a*), the evaluation map is divided in increments of 10 degrees in the right and left while putting the moving direction of the user 150 to the center.

Next, for each of division lines drown in the front of the user 150, the control unit 20 sets an area including the division line with a predetermined width (hereinafter, this area is abbreviated as "division area"). For example, as shown in FIG. 12 (*b*), for 17 division lines excluding division lines extending in the right and left direction from the position of the user 150 among the division lines, the division areas each of which has a predetermined width (in the present embodiment, 1 m) while setting the division line at the center are set. One end of each division line is prescribed by the periphery of the individual area 130 including the moving body 100 and the user 150 and the other end thereof is prescribed by a border line 501 with the second movement destination area established in front of the user 150.

The "second movement destination area" is an area predicted that the user 150 will move in the future at the present moving speed and is set corresponding to the moving speed of the user 150 at that time. For example, the second movement destination area is set to a position near the present position of the user 150 as the moving speed of the user 150 is slower.

Here, in a case that the first movement destination area is set corresponding to the wider flow evaluated in S401, the control unit 20 conducts set of the division areas while limiting to the area including the direction toward the first movement destination area from the present position. On the other hand, in a case that the first movement destination area is not set, the control unit 20 sets the division areas for all division lines of 17 excluding lines extending in the right and left direction from the position of the user 150.

Therefore, against one evaluation map, the division areas can be set for 17 areas at the maximum. The evaluation map can be obtained as the different map corresponding to the moving speed of the user 150. In the present embodiment, since the moving speed of the user 150 exists three kinds and the evaluation maps with three patterns are obtained, the areas of 17×(3 patterns), namely, 51 areas are set.

Next, for the set division areas, that is, each of 51 division areas at the maximum, the control unit 20 integrates the evaluation score of the future situation included in the division area and narrows down the candidate area becoming candidate for conducting path finding among the division areas based on the obtained integrated value. For example, the division areas of a predetermined number (for example, 5) are narrowed down as the candidate areas in small order of the integrated value.

Figure 13:
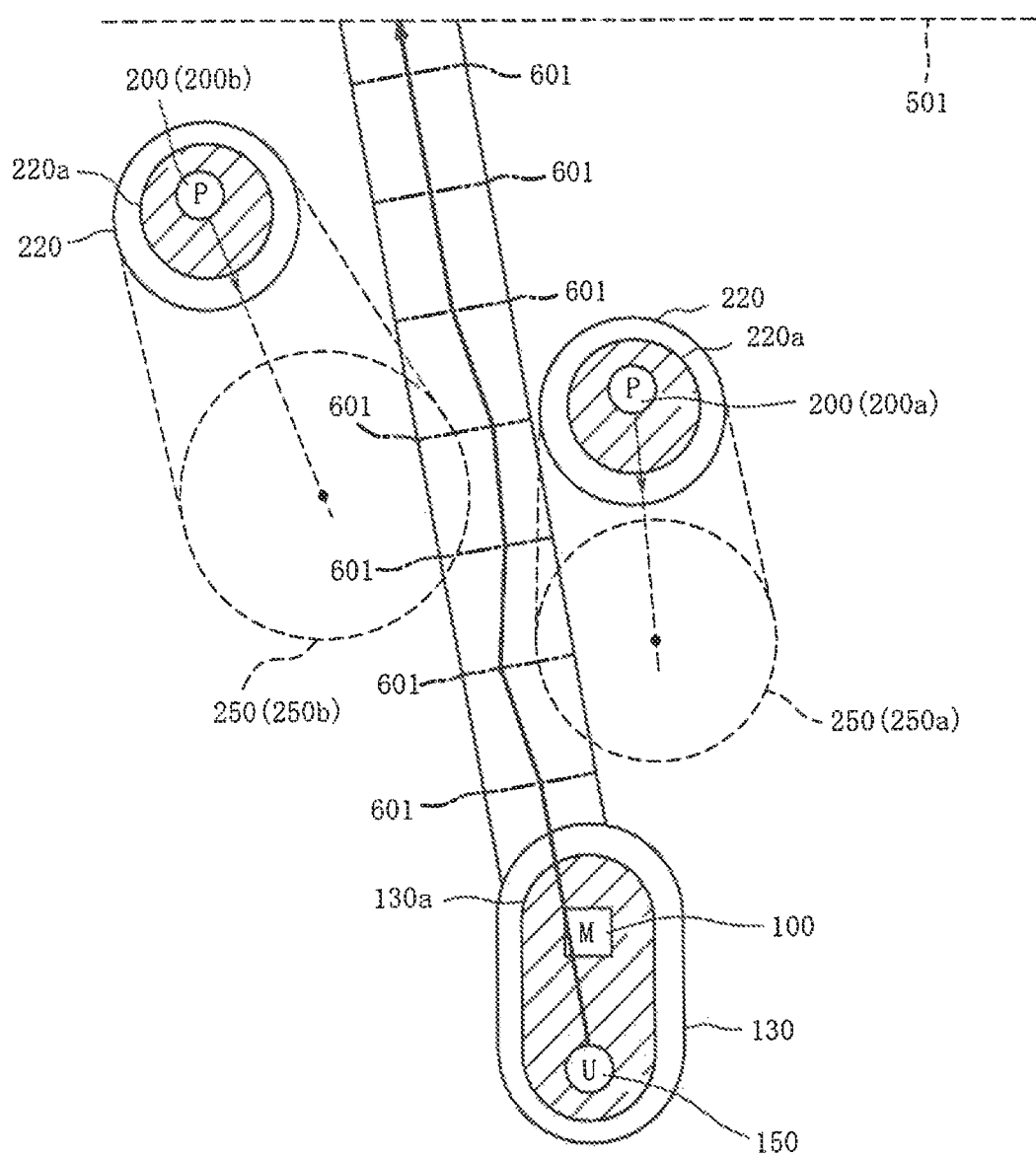
FIG. 13 is a view to explain setting of candidate path conducted in S404.

Description will return to FIG. 10. After the process of S403, the control unit 20 sets the candidate path according to which the user 150 easily moves while intending the candidate areas narrowed down in S403 as an object (S404). The process in S404 is one example of the path estimation device in the present invention. For example, as shown in FIG. 13, the control unit 20 sets line segments 601 normal to the division line every regular interval in the candidate area. Next, the control unit 20 searches point with the lowest evaluation score of the future situation for line segments 610 and specifies a passing candidate point. Next, the control unit 20 connects the passing candidate point specified in each of the line segments 601 and sets the candidate path.

Here, in a case that the point with the lowest evaluation score of the future situation exists on the line segment with a width to some extent, a middle point within the width is specified as the passing candidate point. Further, in a case that a plurality of points with the lowest evaluation score of the future situation exist on the line segment, it is specified as the passing candidate point the point with the fewest turn degree from the passing candidate point determined in the line segment 601 becoming the search object right before the line segment 601 being the present search object among a plurality of points. Or in a case that the line segment 601 becoming the search object right before the line segment 601 being the present search object does not exist, it is made as the passing candidate point the point with the fewest turn degree from the moving direction of the user 150.

Description will return to FIG. 10. After the process in S404, the control unit 20 evaluates movement easiness of the user 150 for each of the candidate paths set in S404 (S405) and finishes the process of S400. The process in S405 is one example of the first evaluation device in the present invention. In the present embodiment, at first, as the candidate path has fewer direction change from the present moving direction of the user 150, such candidate path is evaluated as the path according to which the user 150 easily moves. The path with fewer turn change is, for example, the path that the moving direction from the start point is near to the present moving direction of the user 150.

Figure 14A:
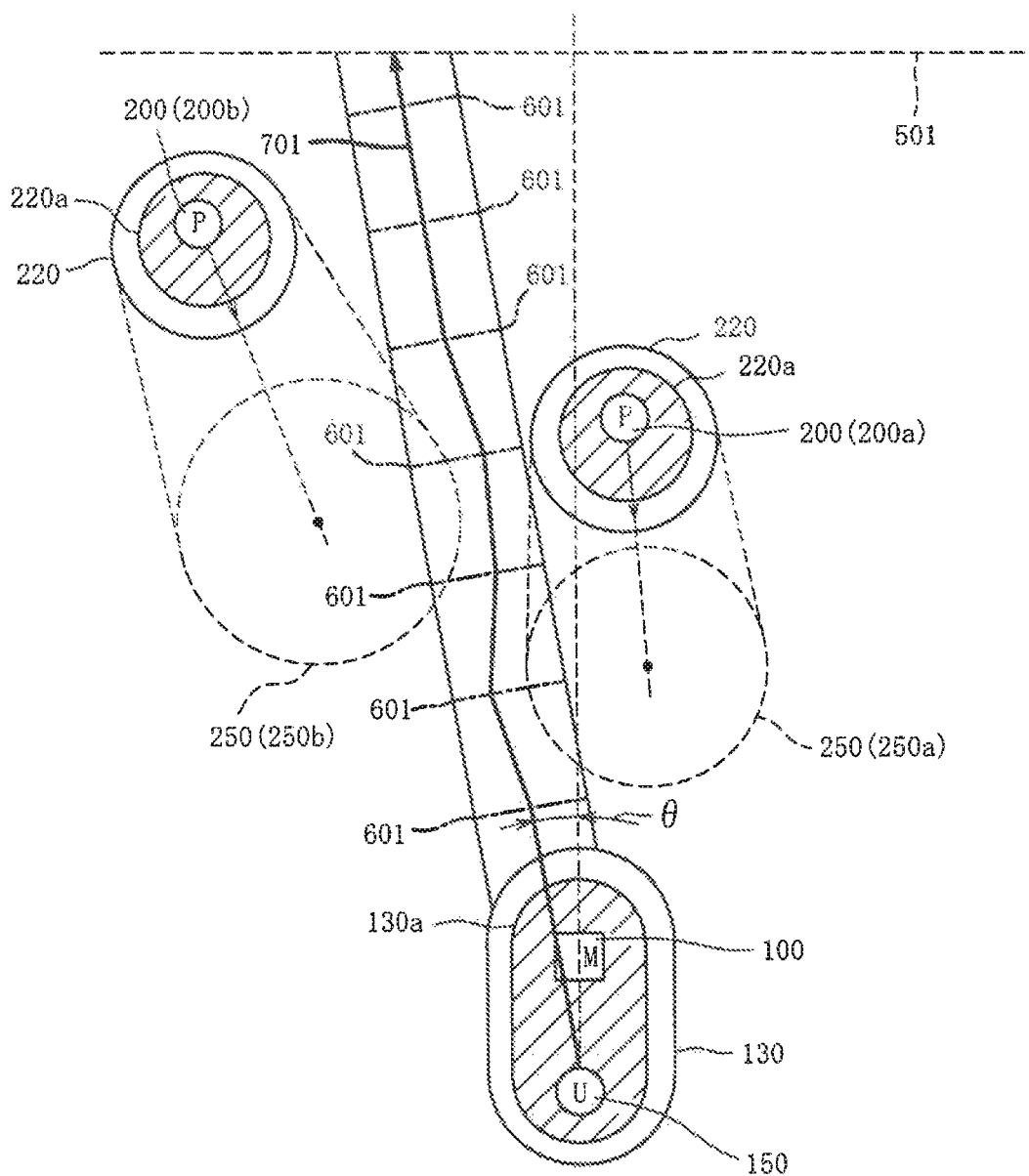
FIG. 14 (a) and FIG. 14 (b) are views to explain evaluation conducted in S405.
Figure 14B:
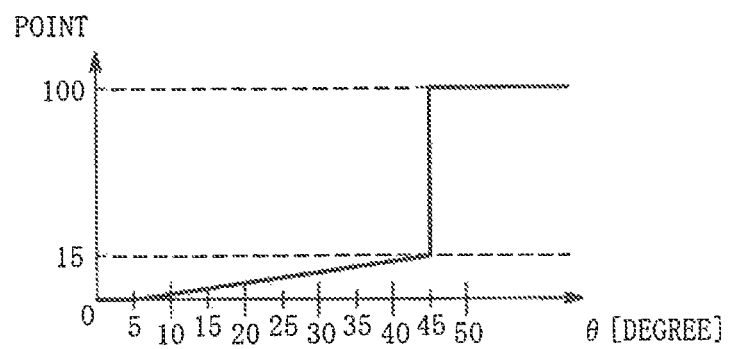

In the present embodiment, as shown in FIG. 14 (a), as the absolute value θ of angle formed by crossing the moving direction from the start point in the candidate path 701 and the present moving direction of the user 150 becomes smaller, such path is evaluated as the path according to which the user 150 easily moves. For example, as shown in FIG. 14 (b), when θ lies in a range of 0 degree to 5 degrees, the evaluation score is made 0 which is the minimum value in evaluation of the candidate path. This considers fluctuation in direction when the user 150 moves. Further, in a case that θ lies in a range of 0 degree to 5 degrees, it is judged that fluctuation in direction at the movement exists, thus it is evaluated that such fluctuation does not influence movement easiness of the user 150.

The evaluation score rises up according to linear function as θ value becomes larger when θ value exceeds 5 degrees and rises up to a range of 45 degrees. Further, at the time that θ value becomes 45 degrees, the evaluation score becomes 100 points which is the maximum value in evaluation of candidate path. That is, in a case that the moving direction from the start point in the candidate path 701 changes 45 degrees or more from the present moving direction of the user 150, it is evaluated that movement easiness when the user 150 moves along such candidate path becomes the minimum (that is, the most difficult to move). Here, FIG. 14 (b) indicates one example of evaluation. So long as it is satisfied the condition that the evaluation score becomes higher when θ value becomes larger than 0, it is not limited to the relation shown in FIG. 14 (b) and evaluation can be done by using various relations.

Further, the path with fewer direction change is the path that the terminal point in the candidate path (that is, reach point to the second movement destination area) and the intersection with the second movement destination area when the user 150 moves in the present moving direction (that is, reach point to the second movement destination area) are near.

Figure 15A:
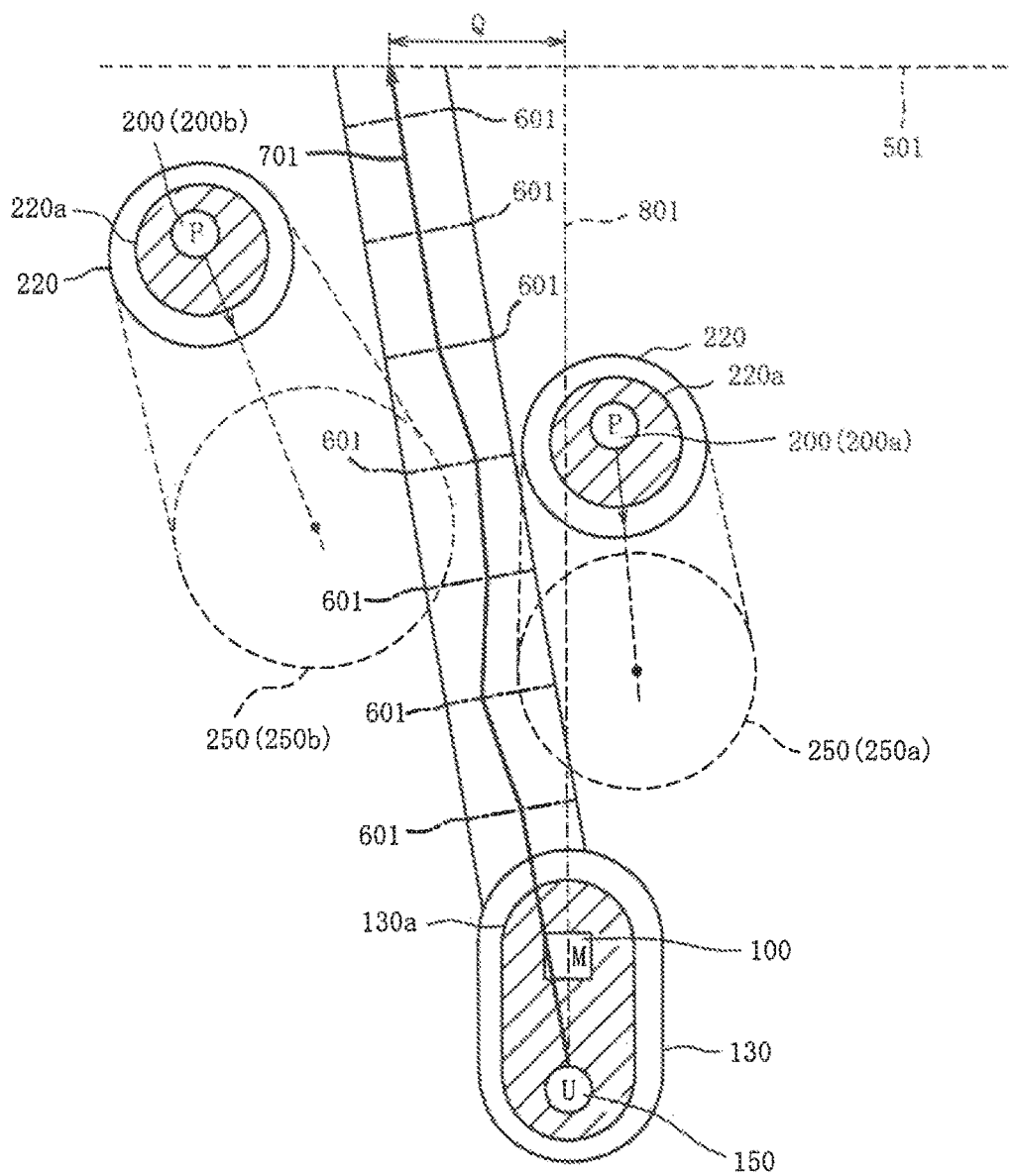
FIG. 15 (a) and FIG. 15 (b) are views to explain evaluation conducted in S405.
Figure 15B:
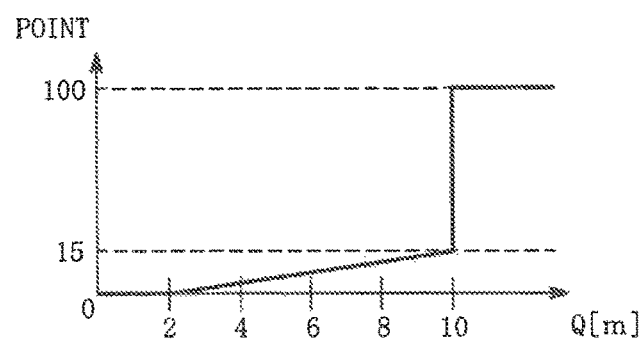

In the present embodiment, as shown in FIG. 15 (a), as the distance Q between the terminal point in the candidate path 701 (that is, intersection of the candidate path 701 and the border line 501) and the intersection of the axis line 801 extending to the present moving direction of the user 150 and the border line 501 is smaller, it is evaluated that such candidate path is the path along which the user 150 easily moves. At that time, when the distance Q lies in a range to some extent, the path substantially coincides with the present moving direction of the user 150 and it is evaluated that the distance Q does not influence to the movement easiness of the user 150.

Here, as mentioned above, since the second movement destination area is set corresponding to the movement speed of the user 150 at that time, it also differs range of the distance Q not influencing movement easiness of the user 150 corresponding to the position of the second movement destination area. As the position of the second movement destination area (that is, position of the border line 501) separates far from the user 150, the range of the distance Q not influencing movement easiness of the user 150 becomes wide.

For example, in a case that the border line 501 separates from the present position of the user 150 by 5 m and, as shown in FIG. 15 (b), the distance Q lies in a range of 0 m to 2 m, the evaluation score is 0 which is the minimum value in evaluation of the candidate path. That is, when the distance Q is 2 m or less against movement of 5 m, it is evaluated that the distance Q does not influence to movement easiness of the user 150.

In the example shown in FIG. 15 (b), when the distance Q exceeds 2 m and changes within a range up to 10 m, the evaluation score rises up according to linear function as the distance Q becomes larger. Further, at the time that the distance Q is 10 m, the evaluation score is made 100 points which is the maximum value in evaluation of the candidate path. That is, in a case that the terminal point in the candidate path separates 10 m or more from the intersection of the axis line 801 and the border line 501, it is evaluated that movement easiness when the user 150 moves along the candidate path becomes the minimum (that is, the most difficult to move).

Here, in FIG. 15 (b), although it is indicated a case that the border line 501 separates 5 m from the present position of the user 150, relations between the distance Q and the evaluation score are prepared by a number settable as the distance between the present position of the user 150 and the border line 501 and it is used among such relations the relation corresponding to the position of the second movement destination area set based on the moving speed of the user 150. Or in the relation shown in FIG. 15 (b), it may be constructed that the value along the axis of abscissa is calculated from the moving speed of the user 150 corresponding to a predetermined function.

FIG. 15 (*b*) is one example of evaluation. So long as the evaluation score becomes higher when the distance Q becomes larger than 0, it is not limited to the relation shown in FIG. 15 (*b*) and evaluation can be conducted by using various relations.

Figure 16A:
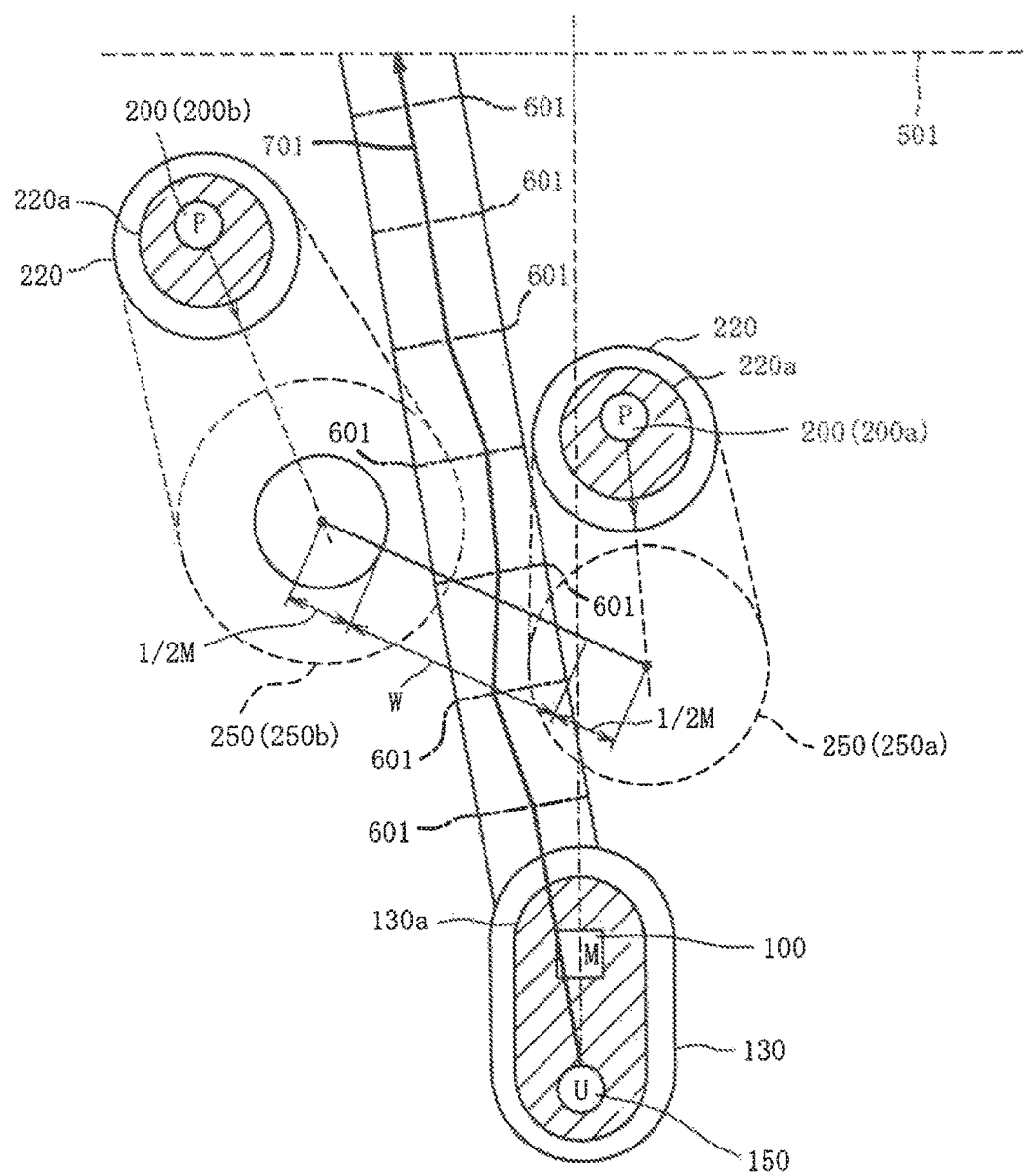
FIG. 16 (a) and FIG. 16 (b) are views to explain evaluation conducted in S405.
Figure 16B:
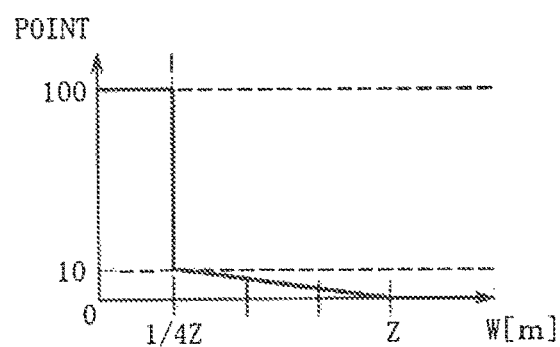

In the present embodiment, second, movement easiness of the user 150 is evaluated considering interference by moving path of the other person 200. Concretely, considering the width of the movement areas 250 for the other person 200 sandwiching the candidate path, movement easiness of the user is evaluated. For example, as shown in FIG. 16 (*a*), in a case that the movement width W set between the movement areas 250 sandwiching the candidate path is equal to or greater in width than the width Z with a direction perpendicular to the moving direction in the exclusive area 130*a*, it is evaluated that such movement area does not influence movement easiness of the user 150. The movement width W is defined as the length of the line segment obtained by subtracting the half length of the width M of the exclusive area 220*a* for the other person 200 from both sides of the line segment among line segments connecting each center of the movement area 250 sandwiching the candidate path.

In the example shown in FIG. 16 (*b*), the evaluation score is made 0 point which is the minimum value in evaluation of the candidate path when the value of W is equal to or greater in width than the width Z of the exclusive area 170*a*. That is, in this example, when the value of W is equal to or greater in width than the width Z, it is evaluated that such exclusive area 170*a* does not influence movement easiness of the user 150.

When the W value is narrower than the width Z of the exclusive area 170*a* and the value of W becomes smaller, the evaluation score rises up according to linear function. Further, when the value of W is ¼ of the width Z, that is, (¼)Z, the evaluation score is made 100 points which is the maximum value in evaluation of the candidate path. That is, when the value of W is ¼ or less of the width Z (that is, width of the exclusive area 170*a* of the user 150), it is evaluated that movement easiness when the user 150 moves along the candidate path is minimum (that is, the most difficult to move).

Every candidate area, evaluation of the movement width W is conducted over the number of the movement area sandwiching the candidate path and the evaluation score in each evaluation is added, thereby movement easiness of the user 150 is evaluated. Here, as for the width W, since the exclusive are 220*a* for the other person 200 is considered, it is considered so that load owed for the other person 200 due to the movement of the user 100 becomes as lower as possible.

In the present embodiment, it is evaluated as movement easiness of the user 150 for each candidate path by adding up values of the evaluation score of the first evaluation mentioned above (that is, evaluation corresponding to the direction change from the present moving direction of the user 150) and the evaluation score of the second evaluation (that is, evaluation corresponding to the movement width W).

Here, FIG. 16 (*b*) is one example of evaluation. As long as it is satisfied the condition that the evaluation score becomes higher when the width W becomes smaller than the width Z, it is not limited to the relation shown in FIG. 16 (*b*) and evaluation can be conducted by using various relations.

Referring with FIG. 17, in the present embodiment, the path determination process done in S500 mentioned above will be described. The path determination process is a process to determine the suitable path from the candidate paths based on the evaluation by S400.

In S500, the control unit 20 evaluates for each of the candidate paths by adding up the score evaluated in S405 every passing candidate point on the candidate path (in the present embodiment, adding up value of the evaluation score in the first evaluation and the evaluation score in the second evaluation) and the score on the candidate path in the evaluation map.

Figure 17A:
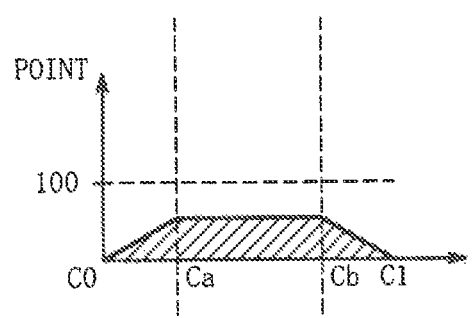
FIG. 17 (a) and FIG. 17 (b) are views to explain determination of the most suitable path conducted in S500.
Figure 17B:
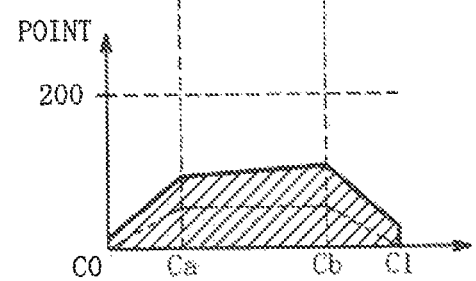

Concretely, as shown in FIG. 17 (*a*), the control unit 20 first plots the score evaluated in S405 every passing candidate point for the graph in which the distance from the start point on the candidate path is represented in the axis of abscissa. Therefore, it is formed the graph in which till reaching the first passing candidate point Ca from the start point C0 of the candidate path, the score rises up from 0 point to the score evaluated in S405 according to linear function and till reaching the terminal point C1 of the candidate path from the last passing candidate point Cb, the score decreases from the score evaluated in S405 to 0 point according to linear function. Here, such graph is formed every candidate path.

Next, as for each graph of every candidate path formed by plotting the score evaluated in S405, the control unit 20 adds the score for each passing candidate point on the candidate path in the evaluation map. Thereby, for example, the graph shown in FIG. 17 (*b*) is obtained. The control unit 20 extracts the candidate path corresponding to the graph with the smallest integrated value among graphs in each of which the score in the evaluation map is added.

Next, the control unit 20 adjusts the score in the evaluation map and the score indicating movement easiness of the user 150 for the candidate path so that the integrated value goes down for the extracted candidate path. The control unit 20 determines the optimized candidate path by adjustment as the optimum path. The control unit 20 determines the first moving direction in the determined optimum path as the optimum moving direction for the user 150.

Here, in S403, when it is estimated that the movement of the user 150 is difficult due to, for example, crowd in the 17 division areas at maximum, the direction in the right and/or left direction from the position of the user 150 is determined as the optimum moving direction.

The optimum direction for the user 150 determined in the above is shown to the user 150 by movement of the moving body 100 based on the process in S600. The user 150 can move with reference to movement of the moving body 100. Since movement of the moving body 100 indicates the moving direction estimated as optimum under the surrounding situation for the user 150, the user 150 can move corresponding to movement of the moving body 100, thereby the user 150 can suitably move against the surrounding situation.

According to the moving body 100 in the present embodiment, the suitable moving direction corresponding to the surrounding situation can be shown to the user 150 so that the user 150 can easily move by utilizing the evaluation map in which the surrounding situation is evaluated. In particular, by evaluating the flow of the other person 200 (wide flow, local flow) existing in the surrounding area, the moving direction corresponding to such flow can be set. Therefore, the moving direction suitable for the surrounding flow can be shown to the user 150.

Further, since the moving body 100 preferentially shows the direction with few direction change from the present moving direction of the user 150, it can be restrained that large direction change is forced to the movement of the user 150. Further, since the moving body 100 preferentially shows the direction with fewer speed change from the present moving speed of the user 150, it can be restrained that large speed change is forced to the movement of the user 150. Furthermore, since the moving body 100 preferentially shows the direction hard to be interfered by the movement path of the other person 200, contact of the user 150 and the other person 200 can be restrained. Further, since the moving body 100 shows to the user the direction in which the uncertain area due to the blind spot is considered, contact with a person suddenly appearing from the blind spot can be restrained.

In a case that the movement area of the other person 200 existing in the surrounding area is predicted after the prediction time t, since the variable value corresponding to the situation of the other person 200 is utilized, the moving body 100 can show the direction easy to move in which the situation of the other person 200 is considered to the user 150. Especially, since the prediction time t is the value corresponding to the relative position of the moving body 100 and the other person 200 and the relative speed to the other person 200 against the user 150, the moving body 100 can show the direction capable of avoiding contact with the other person 200. Further, since the prediction time t considering the room distance $\alpha$ is calculated, the moving body 100 can show the moving direction to the user 150 at the position with room against the other person 200. Thereby, the moving body 100 can show the moving direction to the user 150 as if the moving body is an usher for the surrounding.

The moving body 100 shows to the user 150 the direction in which it is considered not also the exclusive area 130*a* of the individual area 130 including the user 150 and the moving body 100 but also the exclusive area 220*a* in the individual area 220 of the other person 200. Therefore, the direction which the moving body 100 shows to the user 150 is the direction according to which the user 150 can easily move and load occurring due to the movement of the user 150 can be restrained for the other person 200.

Although the present invention is described based on the embodiment in the above, the present invention is not limited to the above embodiment, and various improvements and modifications can be done without departing from the scope of the concept of the present invention.

For example, the values raised in the embodiment indicate one example, thus other values can be naturally adopted.

In the above embodiment, although the other person 200 who is human being is exemplified as the moving body moving around the user 150, animal such as dog or cat and the like or vehicle such as bicycle moving at low speed and the like can be similarly evaluated as the moving body.

In the above embodiment, it is constructed so that the exclusive area 120*a*, 170*a* and 220*a* are provided for the individual area 120, 170 and 220 so that the object bodies do not enter and 200 points which is the maximum value as the score is set to the exclusive area 120*a*, 170*a* and 220*a*. Instead of this construction, it may be constructed so that the score gradually goes down toward the periphery from each center of the moving body 100, the user 150 and the other person 200 without providing the exclusive areas.

In the above embodiment, although it is constructed so that the exclusive areas 130*a* and 220*a* are considered at the time of calculation of the prediction time t or calculation of the width W, it may be constructed to consider the individual area 130 and the individual area 220 instead of the exclusive area 130*a* and the exclusive area 220*a*.

In the above embodiment, it is constructed so that the control unit 20 converts each parameter in the moving body coordinate system into the user coordinate system and grasps the surrounding state while handling the state of the user 150 as the standard. Instead of this, it may be constructed so that the control unit 20 grasps the state of the user 150 and the surrounding area from each parameter (that is, each parameter obtained based on input from the sensing unit 10) in the moving body coordinate system.

In the above embodiment, although it is constructed so that the relative moving direction of the other person in the user coordinate system is calculated from the relative moving direction $\theta i$ of the other person or obstacle against the moving body 100 and the relative moving direction $\theta 0$ of the user 150 against the moving body 100, it may be constructed so that the relative moving direction of the other person in the user coordinate system is calculated considering body direction $\theta B$ of the user 150 against the moving body 100. That is, the relative moving direction $\theta 0$ may be revised by the body direction $\theta B$ and the relative moving direction of the other person in the user coordinate system may be calculated from the revised relative moving direction and the relative moving direction $\theta i$.

In the above embodiment, it is constructed so that the prediction time t is respectively calculated from $(\Delta x - \alpha)/\Delta v$ for each of the other persons 200. That is, in the above embodiment, although the prediction time t is variable value corresponding to the situation of each of the other persons 200, the prediction time t may be a specific value not depending upon the situation of each of the other persons 200.

Here, in a case that the prediction time t is a specific value, it may be constructed so that the prediction time t is changed each time corresponding to the flow speed in the surrounding are of the user. For example, it may be conceivable that when the flow in the surrounding area of the user is comparatively slow, the prediction time t is made longer and as the flow in the surrounding area of the user becomes faster, the prediction time t is made shorter. When the prediction time t is changed corresponding to the flow in the surrounding area of the user, execution time of the main process may be changed corresponding to such change.

In the above embodiment, although it is constructed that the prediction time t is calculated considering the room distance $\alpha$, it may be set $\alpha = 0$. That is, when the other person 200 and the moving body 100 approach with the relative speed $\Delta v$ along the line connecting both, the time till both contact may be the distance calculated by the prediction time t.

In the above embodiment, although it is constructed that the prediction time t is calculated by using $\Delta x$ which is the distance between the other person 200 and the moving body 100 and the relative speed $\Delta v$ of the other person 200 in the user coordinate system, for example, it may be constructed that the speed of component obtained by dividing the relative speed of the other person 200 in the user coordinate system in the direction connecting the other person 200 and the moving body 100 may be utilized as $\Delta v$.

In the above embodiment, it is constructed that the evaluation maps of three patterns are formed by utilizing the three kinds of moving speeds including the present moving speed considering change of the moving speed of the user 150. Instead of this construction, it may be constructed that, without considering change of the moving speed of the user 150, the evaluation map of one pattern is formed from only the present moving speed.

In the above embodiment, although change width of the moving speed of the user 150 is set to a range of −2 km/h to +2 km/h, it is not limited to this and various change widths such as a range of −3 km/h to +3 km/h and the like can be adopted. Further, although an increment width within the range of change width is set to 2 km/h, various increment widths such as 1 km/h and the like can be adopted within the range of the change width.

In the above embodiment, although the division line to set the division area in the evaluation map is the line to divide the front area of the user 150 at predetermined angle intervals, for example, division by the division lines may be made dense at the side where angle against the moving direction of the user 150 is small and the division by the division lines may be made sparse at the side near the right and left direction of the user 150, without dividing at predetermined angle intervals.

In the above embodiment, in S401, when it is judged that wide flow exists, the moving direction to ride on the wide low is narrowed down considering such flow and the strength and the like, on the other hand, in S402, the local flow is evaluated by the score and such evaluation score is added on the evaluation map. Instead of this, similar to the local flow, the wide flow may be evaluated by the score and such evaluation score may be added on the evaluation map.

Or as for the local flow, similar to the wide flow, it is judged whether or not the flow exists and when it is judged that the local flow exists, it may be constructed that the moving direction to ride on the local flow is narrowed down corresponding to the relative speed with the user 150 and the like. Here, when the moving direction to ride on the local flow is narrowed down, setting of the division area is limited to the area including the moving direction narrowed down and conducted in S 403.

In the above embodiment, although it is constructed so that both the wide flow and the local flow are considered, any one of both may be considered. Further, it may be constructed that the optimum moving direction is separately determined for each of the wide flow and the local flow. In this case, when different results are given for the optimum moving direction, it may be constructed that showing manner is changed corresponding to the result determined based on the wide flow or the result determined based on the local flow.

In the above embodiment, although it is constructed so that the candidate path is set by connecting the points that the evaluation score of the future situation is the lowest on the line segment 601 set in the candidate area in S404, it may be constructed that the candidate path is set by connecting the line segment contacting with the area that the score within the candidate area is low.

In the above embodiment, although it is constructed that the candidate path corresponding to the graph that the integrated value is the lowest is extracted among the candidate paths in S500, it may be constructed that the candidate path that total score of the score in each passing candidate point evaluated in S405 and the score on the candidate path in the evaluation map corresponds to a predetermined condition, is excluded from the extraction object even if such candidate path corresponds to the graph that the integrated value is the lowest. For example, the candidate path that above total score abruptly rises up against the adjacent passing candidate point is excluded from the extraction object. Or the candidate path that the maximum value of the total score is higher than the predetermined value is excluded from the extraction object.

In the above embodiment, although it is constructed that the score in the evaluation map and the score indicating movement easiness of the user 150 against the candidate path are adjusted for the extracted candidate path, thereby the integrated value goes down, it may be constructed that the total score of the score evaluated in S405 in each passing candidate point and the score on the candidate path in the evaluation map are adjusted so as to suitably change. For example, it may be constructed that the total score abruptly rising up against the adjacent passing candidate point may be adjusted so as to go down. Or it may be constructed that the maximum value of the total score may be adjusted so as to go down.

In the above embodiment, although it is constructed that one optimum path is determined in S500, it may be constructed that the path is determined under a state that the direction has a range to some extent. In the present modification, in a case that the moving direction is shown to the user 150 in S600, the predetermined direction (for example, center in the range) within the range may be shown.

In the above embodiment, although it is constructed that the optimum moving direction is shown to the user 150 by movement of the moving body 100, it is not limited to this construction, and for example, it may be constructed that the optimum moving direction is shown by displaying it through characters or arrows and the like on the display of the display unit 103. Or it may be constructed that the speaker is provided in the HMI unit 40 and the optimum moving direction may be shown by sounds.

In the above embodiment, although it is constructed that the future situation in the surrounding area and the uncertain area are predicted in S300 and those are evaluated, field prediction and evaluation is not limited to the above method and such prediction and evaluation can be conducted by utilizing the other model. For example, by utilizing the model of person flow supposing that persons are particles and the model of person flow by speed vector field and the like, field prediction and evaluation may be conducted. For example, by utilizing the social force model which is the model cited in "Yamamoto Gou, Okada Masashi, parameter identification of walker group model using walk trace of person and application to intersection flow control, the 29th Japan Robot Society Academic Lecture, RSJ2011AC1N1-2 (CD-ROM), 2011 Sep. 7, Tokyo)", the model that collision avoidance deed is added by prediction to the model similar to Social Force Model, decision making model for destination selection and the like, the model paying attention for phenomenon called "intersection flow" in which flow of plural persons are intersected, field prediction and evaluation may be conducted.

The invention claimed is:

1. A moving body apparatus for use with a user, the moving body apparatus comprising:
   a display screen configured to display information to the user;
   a user detector configured to detect a situation of the user;
   a surrounding situation detector configured to detect a surrounding situation of the moving body apparatus;
   a processor programmed to:
      predict a movement of object bodies existing in surrounding area as future situation in the surrounding area based on the detected surrounding situation;
      extract candidates of direction to determine the moving direction shown to the user based on the predicted future situation in the surrounding area, wherein a direction corresponding to flow flowing with a speed difference in a predetermined range against moving speed of the user is preferentially extracted as the candidate among flows not defying the moving direction of the user;

determine a moving direction shown to the user based on the extracted candidates of direction and the detected situation of the user; and display, on the display screen, a direction corresponding to the determined moving direction to the user.

2. The moving body apparatus according to claim 1, wherein the processor evaluates movement easiness of the user in the surrounding area based on the predicted future situation and the detected situation of the user and determines the moving direction shown to the user based on the movement easiness.

3. The moving body apparatus according to claim 1, wherein the processor is further programmed to:

evaluate the movement easiness of the user in the surrounding area based on the predicted future situation in the surrounding and the detected situation of the user; and wherein the moving direction shown to the user is determined based on the evaluated movement easiness.

4. The moving body apparatus according to claim 3, wherein the processor is further programmed to:

estimate a path that does not contact the object bodies until the user reaches a destination area when the user moves to the destination area determined corresponding to the detected user situation in a candidate direction corresponding to the extracted direction in the predicted future situation in the surrounding area;

wherein the processor evaluates that the user easily moves as a terminal point of the path is nearer to a position where the moving direction indicated by the detected user situation and the destination area intersect among the estimated paths.

5. The moving body apparatus according to claim 3, wherein the processor is further programmed to:

estimate a path that does not contact the object bodies until the user reaches a destination area when the user moves to the destination area determined corresponding to the detected user situation in a candidate direction corresponding to the extracted direction in the predicted future situation in the surrounding area;

wherein the processor evaluates that the user easily moves as an absolute value of angle change of the moving direction from a start point of the path against the moving direction indicated by the detected user situation is smaller among the estimated paths.

6. The moving body apparatus according to claim 1, wherein the processor is further programmed to:

evaluate flow of the object bodies in the surrounding area based on the predicted future situation in the surrounding area;

wherein the moving direction shown to the user is determined based on the evaluated flow of the object bodies.

7. The moving body apparatus according to claim 1, further comprising:

movement control device having wheels configured to move the moving body apparatus in the surrounding area of the user based on the detected situation of the user;

wherein the display screen shows the moving direction to the user by making the moving body apparatus move in the surrounding area in front of the user by the movement control device so that a direction corresponding to the moving direction determined by the determination device is shown to the user.

8. The moving body apparatus according to claim 1, wherein the processor preferentially extracts a direction corresponding to flow not defying the moving direction of the user as the candidate among the evaluated flows of the object bodies.

9. The moving body apparatus according to claim 1, wherein the processor predicts movement of the object bodies based on the detected surrounding situation and an uncertain area where change in the future is uncertain based on a blind spot by the object bodies existing in the surrounding area as the future situation in the surrounding area.

10. The moving body apparatus according to claim 1, wherein the processor predicts an area where the object bodies are able to exist after a predetermined prediction time as the movement of the object bodies.

11. The moving body apparatus according to claim 10, wherein the predetermined prediction time is a variable value corresponding to situation of each object body for each of the object bodies existing in the surrounding area.

12. The moving body apparatus according to claim 10, wherein the processor makes the object bodies relatively approaching to the user and the moving body apparatus a single object and conducts prediction of the area for each of the object bodies becoming the single object, and wherein the predetermined prediction time is a value based on a value corresponding to a distance between the user or the moving body apparatus and the object bodies and relative speed of the object bodies against the user or the moving body apparatus.

13. The moving body apparatus according to claim 12, wherein the predetermined prediction time is calculated as a time until a first area formed with a predetermined size in the surrounding area containing the user and the moving body when the user and the moving body and the object bodies approach with the relative speed of the object bodies against the user or the moving body and a second area formed with a predetermined size in the surrounding area of the object bodies reach a position where the first area and the second area separate with a predetermined distance therebetween.

14. The moving body apparatus according to claim 10, wherein the processor is further programmed to:

estimate a path that does not contact the object bodies until the user reaches a destination area when the user moves to the destination area determined corresponding to the detected user situation in a candidate direction corresponding to the extracted direction in the predicted future situation in the surrounding area;

wherein the processor evaluates that the user easily moves as a width between areas sandwiching the path becomes wider in a case that the areas sandwiching the estimated path exist in the predicted area.

15. The moving body apparatus according to claim 14, wherein the processor evaluates that the user easily moves in a case in which the width between the areas sandwiching the path is wider than a width of the first area formed with a predetermined size in the surrounding area containing the user and the moving body in comparison with a case that the width between the areas sandwiching the path is narrower than the width of the first area.

16. The moving body apparatus according to claim 14,
wherein the width between the areas sandwiching the path
is a length of line segment outside of the second area
formed with a predetermined size around the object
bodies corresponding to each area when connecting
center of each area.

17. The moving body apparatus according to claim 14,
wherein the processor predicts movement of the object
bodies by utilizing moving speed of the user indicated
by the detected user situation and predicts the movement of the object bodies by utilizing moving speed
different from the moving speed of the user,
wherein the processor extracts candidates of direction to
determine the moving direction shown to the user every
moving speed of the user based on the predicted future
situation in the surrounding area including movement
of the object bodies for every moving speed of the user,
wherein the processor estimates the path that does not
contact the object bodies for every moving speed of the
user, and
wherein the processor evaluates that the user easily moves
as the moving speed of the user utilized to predict the
movement of the object bodies is nearer to the moving
speed of the user indicated by the detected user situation among the estimated paths for every moving speed
of the user.

* * * * *